United States Patent [19]
Hattori et al.

[11] Patent Number: 5,560,690
[45] Date of Patent: Oct. 1, 1996

[54] DISTRIBUTION SYSTEM FOR SELECTIVELY CONTROLLING AND SUPPLYING BRAKE PRESSURE TO WHEELS

[75] Inventors: Noriaki Hattori, Anjou; Kenji Tozu, Kariya; Jun Mihara, Toyoake; Takayuki Itoh, Nagoya; Shingo Sugiura; Norio Yamazaki, both of Kariya; Shoji Inagaki, Susono; Masaki Yamamoto, Kakegawa, all of Japan

[73] Assignees: Aisin Seiki Kabushiki Kaisha, Kariya; Toyota Jidosha Kabushiki Kaisha, Toyota, both of Japan

[21] Appl. No.: 310,729

[22] Filed: Sep. 22, 1994

[30] Foreign Application Priority Data

Sep. 22, 1993 [JP] Japan ................................. 5-236033
Sep. 24, 1993 [JP] Japan ................................. 5-237016

[51] Int. Cl.$^6$ ............................... B60T 8/04; B60T 8/60
[52] U.S. Cl. ........................................ 303/116.2; 303/146
[58] Field of Search ............................ 303/91, 95, 100, 303/111, 114.1, 113.1, 116.2, 146

[56] References Cited

U.S. PATENT DOCUMENTS

| | | | |
|---|---|---|---|
| 4,758,053 | 7/1988 | Yasuno | 303/111 |
| 4,881,785 | 11/1989 | Ushijima et al. | 303/111 |
| 4,887,869 | 12/1989 | Nishii et al. | 303/114.1 |
| 4,898,431 | 2/1990 | Karnopp et al. | |
| 4,989,925 | 2/1991 | Kohno | 303/116.2 |
| 4,998,593 | 3/1991 | Karnopp et al. | |
| 5,112,115 | 5/1992 | Willmann et al. | 303/114.1 |
| 5,207,483 | 5/1993 | Shimada et al. | 303/111 |
| 5,211,453 | 5/1993 | Van Zanten et al. | 303/111 |
| 5,224,765 | 7/1993 | Matsuda | 303/111 |
| 5,267,783 | 12/1993 | Inoue et al. | 303/111 |
| 5,333,944 | 8/1994 | Shirai et al. | 303/116.2 |
| 5,385,393 | 1/1995 | Tanaka et al. | 303/111 |

FOREIGN PATENT DOCUMENTS

| | | |
|---|---|---|
| 3616907 | 11/1987 | Germany . |
| 4185562 | 7/1992 | Japan . |
| 4287754 | 10/1992 | Japan . |

*Primary Examiner*—Matthew C. Graham
*Attorney, Agent, or Firm*—Sughrue, Mion, Zinn, Macpeak & Seas

[57] ABSTRACT

A brake force distribution control system comprising wheel speed sensing means S1, S3 which detect wheel speeds VWFR, VWRR of a front right wheel FR and a rear right wheel RR respectively, standard speed calculating means M1 calculating first speed value B and second speed value C from each of the wheel speeds VWFR, VWRR, and figuring out front medium value of VWFR, B and C and rear medium value of VWFR, B and C as standard wheel speeds VWSFR, VWSRR respectively, comparison means M2 calculating a difference between the standard wheel speeds VWSRR and VWSFR and driving means M3 operating a pressure control valve unit FV depending on the differences so as to modulate brake force of the rear right wheel RR relative to that of the front right wheel FR.

10 Claims, 23 Drawing Sheets

DISTRIBUTION SYSTEM FOR SELECTIVELY CONTROLLING AND SUPPLYING BRAKE PRESSURE TO WHEELS

FIELD OF THE INVENTION

The invention relates to an apparatus for controlling a liquid brake pressure applied to a wheel brake, and while not intended to be limited thereto, in particular, to an apparatus which is preferred for use in an antiskid control or traction control in which a compression or decompression of a wheel brake pressure is repeated as desired on the basis of signals representing a wheel speed and a wheel slip rate in order to avoid wheel lock as the wheel is braked or an acceleration wheel idling as a driver intends to apply a brake to or to accelerate a vehicle, and which is also preferred for use in a control of braking efforts to be distributed among front and rear, and left and right wheel brakes in order to secure a running stability and a steerability in the event a change occurs in the steering, acceleration/deceleration, up/down grade of road surface or unevenness, all of which influence upon the driving or running condition of the vehicle, and in which the wheel brake pressures are individually increased or decreased in accordance with the calculated distribution.

BACKGROUND OF THE INVENTION

Normally, a brake pressure (primary pressure) corresponding to the degree of depression of a brake pedal being operated by a driver is applied to a wheel brake from a brake master cylinder. A moving speed (reference speed) of a vehicle is estimated from the rotational speed of a plurality of wheels. The slip rate of wheels or the coefficient of friction, $\mu$, of a road surface is calculated or estimated from the reference speed and the rotational speed of wheels, and the wheel brake pressure is decompressed so as to avoid a complete interruption of rotation of the wheels (a wheel lock) even through the vehicle continues its movement. Subsequently the brake pressure is compressed or intensified so that the stroke through which the braking is applied be minimized, and such decompression and compression are repeated as required. Such operation is commonly referred to as an antiskid control. Such an antiskid control is enabled by the provision of a source of pressure comprising an intensifying/reducing valve which decompresses or compresses a wheel brake pressure, a fluid pump for supplying a pressure (secondary pressure) higher than the primary pressure, and an electric motor which drives the pump. The antiskid control is executed by an electronic controller, and when it determines that there is a need to change a wheel brake pressure (automatic intervention), it causes the pressure source to supply the secondary pressure to the valve, which then selectively switches the wheel brake pressure between a low pressure (drain pressure) and the secondary pressure. When the low pressure is supplied, the wheel brake pressure is reduced while when the secondary pressure is supplied, the wheel brake pressure rises. One form of such antiskid control is disclosed in Japanese Laid-Open Patent Application No. 38,175/1990.

in addition to controlling the wheel brake pressure from the viewpoint of the slip rate of the wheels and the distance across which they are braked as a vehicle is being braked, another form of controlling the wheel brake pressure is recently proposed in which a distribution of braking efforts applied to the front and rear, and left and right wheel brakes, which secures a directional stability of a vehicle being braked in accordance with the driving and/or running condition of the vehicle as well as a load distribution on the vehicle, is calculated by an electronic controller. The intensifying/reducing valve is used to regulate the wheel brake pressure to achieve such distribution. The present inventors have previously proposed such system in Japanese Laid-Open Patent Applications No. 85,327/1993, No. 85,340/1993 and No. 85,336/1993. A wheel brake pressure system for such antiskid control and the braking efforts distribution control in which the secondary pressure applied to the intensifying/reducing valve is chosen to be a hydrobooster pressure, which is on the order of 20%, for example, higher than the primary pressure, is disclosed in Japanese Laid-Open Patent Application No. 144,179/1994.

In all these applications cited above, the depression of brake pedal by a driver is a prerequisite to the initiation of the antiskid control as a matter of course, and also to initiate the braking efforts distribution control. In the antiskid control, if a braking action applied to the wheels as a result of the depression of a brake pedal results in an overbraking, the wheel brake pressure is once decompressed, and is then intensified so as to achieve a desirable slip rate of the wheels and to minimize the distance across which the wheels are being braked. In addition, depending on a decision rendered by a driver, the brake pressure is also operated through the brake pedal, and accordingly, it is reasonable to employ the hydrobooster pressure which is responsive to the depression or release of the brake pedal for the compression during the antiskid control. However, in controlling the braking efforts distribution, the purpose is to regulate the brake pressures applied to the individual wheels so as to realize a distribution of individual wheel brake pressures (applied to front and rear, and left and right wheel brakes) which is advantageous in assuring a directional stability and a steerability of a vehicle so as to accommodate for the driving/running condition of the vehicle and a load distribution on the vehicle. Accordingly, the use of the hydrobooster pressure may fail to realize a required distribution of the braking efforts. For example, if the depression of the brake pedal is small, the resulting hydrobooster pressure is low, while a higher brake pressure may be required to achieve the distribution of the braking efforts.

During a rapid start without depression of a brake pedal or during a quick turn, a temporary shift may occur in a distribution of load on the vehicle or the coefficient of friction with the road surface may vary from wheel to wheel, both of which may degrade the directional stability or steerability of the vehicle. In such instance, it is preferable to have a control over the distribution of the braking efforts, but since the depression of the brake pedal is lacking, the wheel brake pressure cannot be increased by the hydrobooster pressure. During the control of the distribution of the braking efforts, it is preferred that the brake pressure of each of the four wheels can be individually controlled, even though the directional stability and the steerability can be maintained by the control over the distribution of the braking efforts, applied to a specific one or more of the wheel brake pressures without individually controlling the brake pressure of all the wheels depending on the type of the vehicle (the location of an engine, the location of a driver's seat, the distribution of seats, front drive/rear drive/all wheel drive, front wheel steering/rear wheel steering/front and rear wheel steering, the presence or absence of luggage carrier).

SUMMARY OF THE INVENTION

It is a first object of the invention to provide an apparatus for controlling the distribution of braking efforts which is capable of realizing a control over the distribution of braking efforts in the absence of an operation over a wheel brake pressure by a driver, and it is a second object of the invention to provide an apparatus for controlling the distribution of braking efforts which is capable of continuing such control, without interruption and without causing any sense of abnormality on the part of a driver, when a brake pedal is operated by a driver during such control.

In accordance with the invention, there is provided an apparatus for controlling wheel brake pressures comprising brake pressure generating means (2, 5) operated by a driver for generating a pressure which corresponds to the magnitude of operation by the driver; a source of constant pressure (21, 22) for producing a high pressure which is substantially constant; selection means (64, 65, 61–63) for selecting one of the pressure corresponding to the magnitude of operation and the high pressure generated by the source (21, 22); first intensifying/reducing means (312) for selectively supplying the pressure selected by the selection means (64, 65, 61–63) or a low pressure to a front right wheel brake (51); second intensifying/reducing means (334) for selectively supplying the pressure selected by the selection means (64, 65, 61–63) or a low pressure to a front left wheel brake (52); third intensifying/reducing means (356) for selectively supplying the pressure selected by the section means (64, 65, 61–63) or a low pressure to a rear right wheel brake (53); and fourth intensifying/reducing means (378) for selectively supplying the pressure selected by the selection means (64, 65, 61–63) or a low pressure to a rear left wheel brake (54).

It is to be noted that numerals appearing in parentheses denote reference characters used to designate corresponding components of an embodiment shown in the drawing in order to facilitate the understanding.

Wheel Braking Responsive to an Operation of a Driver to Control Wheel Brake Pressure Selection means (64, 65, 61–63) selects a pressure which corresponds to the magnitude of an operation of the driver, whereby such pressure corresponding to the magnitude of the operation is supplied to wheel brakes (51–54). Specifically, a pressure generated by a master cylinder (2) is supplied, and a brake pressure which corresponds to the magnitude of operation by the driver is applied to each of the wheel brakes (51–54).

Antiskid Control

The selection means (64, 65, 61–63) selects a high pressure generated by the source of constant pressure (21, 22). Each of the intensifying/reducing means (312, 334, 356, 378) selectively supplies either the high pressure or a low pressure (drain pressure) to each of the wheel brakes (51–54) individually, whereby, the brake pressures of the wheel brakes (51–54) are determined individually.

Traction Control

The selection means (64, 65, 61–63) selects the high pressure generated by the source of constant pressure (21, 22). This results in applying the high pressure to the intensifying/reducing means (356, 378). Each of these intensifying/reducing means (356, 378) selectively supplies either the high pressure or a low pressure to each of the associated wheel brakes (53, 54), thereby individually determining the brake pressure of these wheel brakes.

Control Over the Distribution of Braking Efforts

The selection means (64, 65, 61–63) selects the high pressure generated by the source of constant pressure (21, 22). This results in applying the high pressure to all the intensifying/reducing means (312, 334, 356, 378). Each of these intensifying/reducing means (312, 334, 356, 378) selectively supplies either the high pressure or low pressure to the associated wheel brakes (51, 54), whereby the brake pressures of the wheel brakes (51–54) are determined individually.

As mentioned, with the apparatus for controlling wheel brake pressures according to the invention, the antiskid control, the traction control as well as the control over the distribution of braking efforts can be carried out. In each of these controls, the brake pressure of any one of front and rear or left and right wheel brakes can be individually controlled. In particular, in the control over the distribution of braking efforts, since the high pressure generated by the source of constant pressure (21, 22) which is substantially constant is individually supplied to the wheel brakes, if a brake pressure which results from an operation of a brake by a driver is low, it is assured that if the brake pressure resulting from a brake operation by the driver remains low, a higher brake pressure which is required to maintain the directional stability and the steerability of the vehicle can be supplied to any one of the wheel brakes, thus achieving a higher level of directional stability and steerability. In addition, since the high pressure generated by the source of constant pressure (21, 22) is supplied to the intensifying/reducing means (312, 334, 356, 378), rather than the brake pressure resulting from a brake operation by the driver, the brake pressures of the four wheels can be individually controlled so as to maintain a high level of directional stability and the steerability even during a rapid start without a brake operation by a driver or during a quick turn.

Other objects and features of the invention will become apparent from the following description of several embodiments thereof with reference to the drawings.

DESCRIPTION OF PREFERRED EMBODIMENTS

First Embodiment

Figure 1:
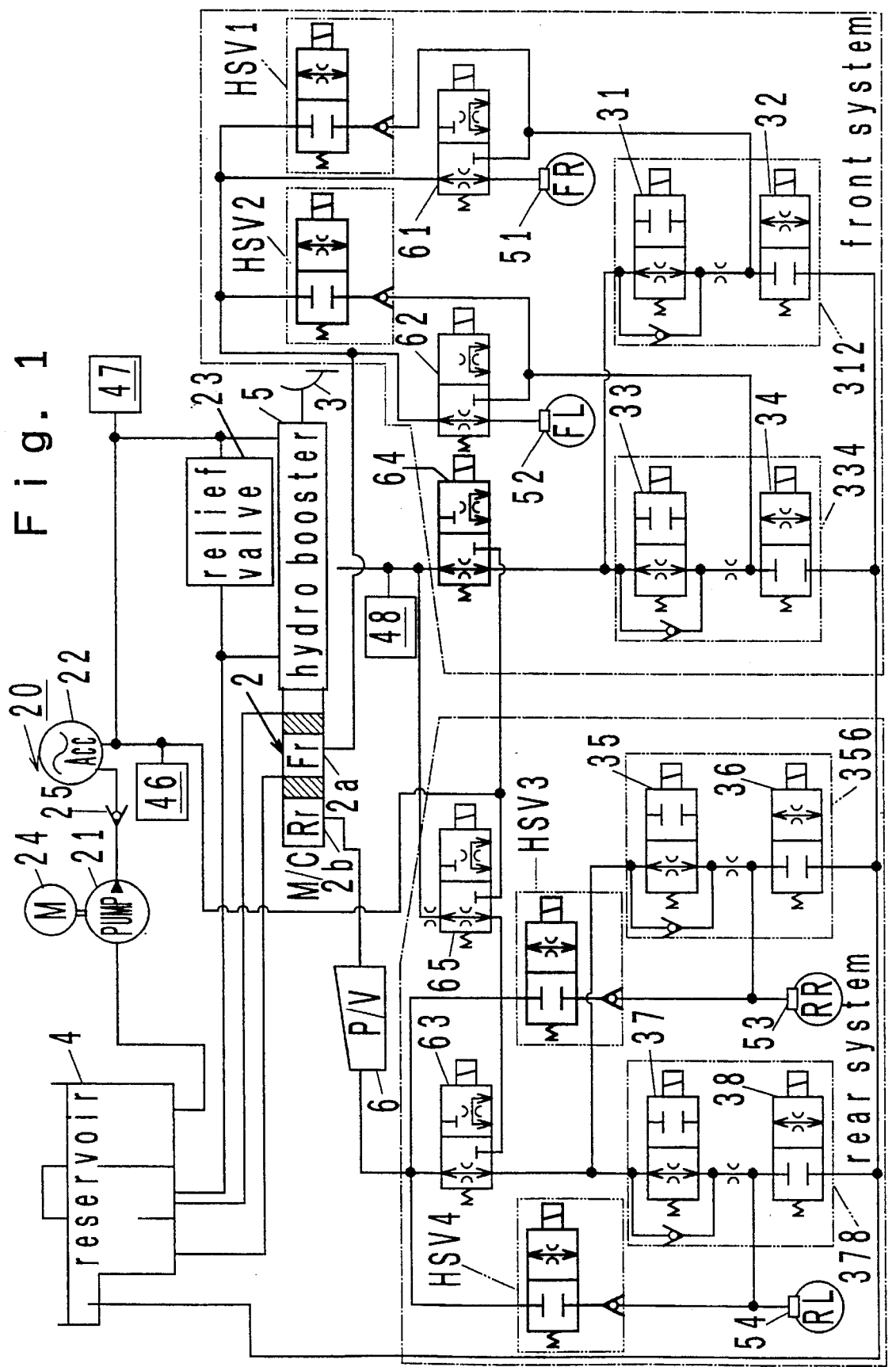
FIG. 1 is a block diagram showing an overall arrangement of a first embodiment of the invention.
Figure 2:
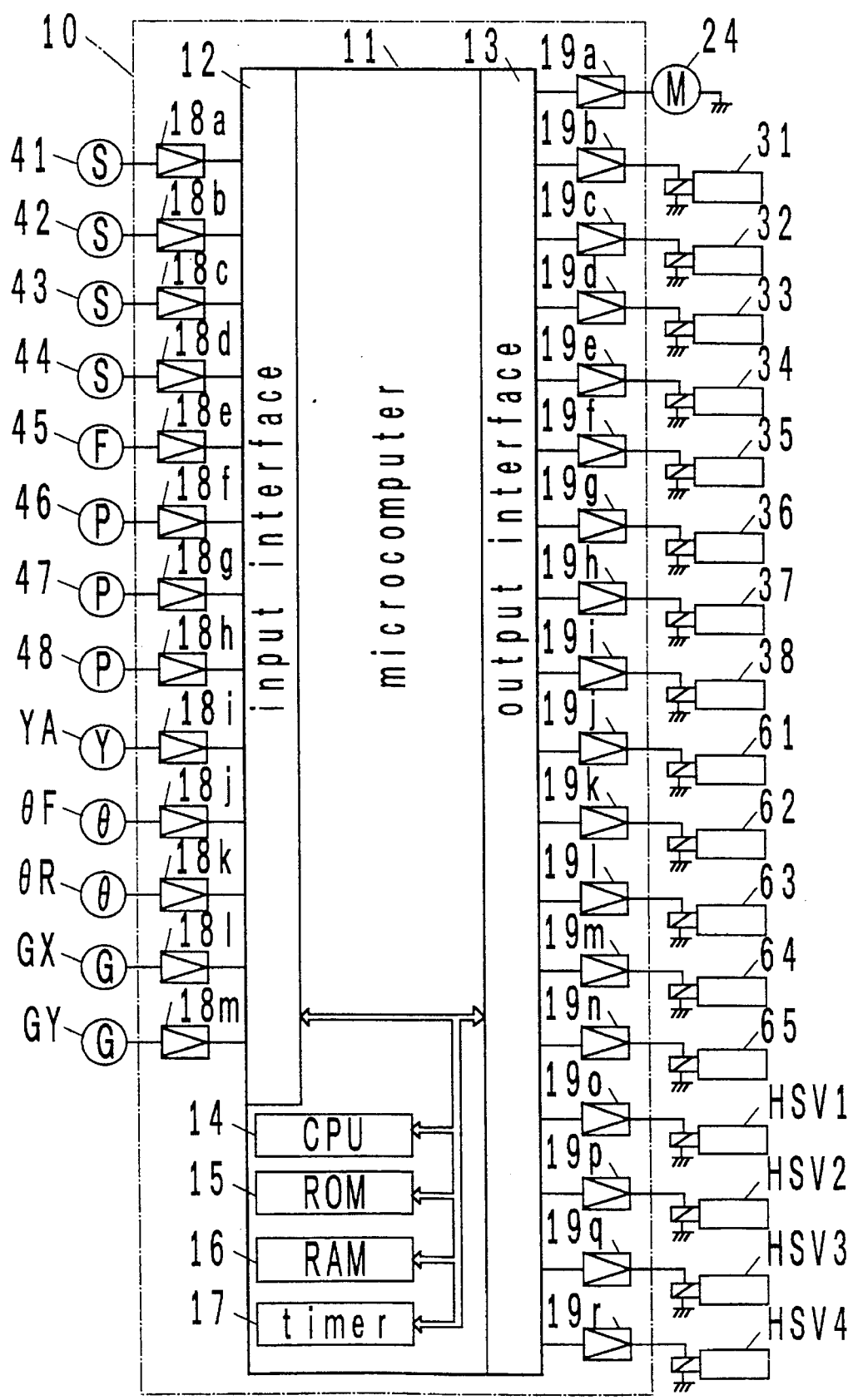
FIG. 2 is a block diagram showing an essential construction of an electronic controller which controls the energization of solenoid controlled valves in a wheel brake pressure system shown in FIG. 1.

FIG. 1 shows a wheel brake pressure system according to a first embodiment of the invention, and FIG. 2 schematically shows an electrical system connected with various solenoid controlled valves and sensors in the wheel brake pressure system for controlling the pressures of wheel brakes 51–54.

Initially referring to FIG. 1, when a brake pedal 3 is depressed by a driver, a master cylinder 2 of tandem type generates a hydraulic pressure (2a) for front wheel brakes and a hydraulic pressure (2b) for rear wheel brakes, which correspond to the pressure of the depression. Under the condition shown in FIG. 1, the hydraulic pressure (2a) for the front wheel brakes is applied to a wheel brake 51 for a front right wheel FR and to a wheel brake 52 for a front left wheel FL through solenoid controlled valves 61, 62, respectively. Hydraulic pressure (2b) for rear wheel brakes is regulated by a proportional control valve 6 and is then fed through a solenoid controlled valve 63 to be applied to a wheel brake 53 for a rear right wheel RR through an intensifying solenoid controlled valve 35 of an intensifying/reducing valve unit 356, and also to a wheel brake 54 for a rear left wheel RL through an intensifying solenoid controlled valve 37 of an intensifying/reducing valve unit 378. Such liquid brake pressures will be hereafter referred to as a primary pressure.

A pump 21 is driven by an electric motor 24 to withdraw a braking liquid from a reservoir 4 and supplies it to an accumulator 22 through a check valve 25. A high pressure from the accumulator 22 is supplied to a hydrobooster 5 and solenoid controlled valves 64, 65. The pressure of the braking liquid within the accumulator 22 is detected by a pressure sensor 46. A low pressure switch 47 is closed when the pressure in the accumulator 22 reduces below a lower limit. A relief valve 23 is interposed between the reservoir 4 and the accumulator 22 so that when the pressure in the accumulator 22 reaches an upper limit, the relief valve 23 operates to discharge the braking liquid from the accumulator 22 to the reservoir 4 until the pressure is lowered below the upper limit. An electronic controller 10, shown in FIG. 2 and which will be described later, monitors the opening/closing of the switch 47, indicating that the pressure is above or below the lower limit, and also reads the pressure detected by the pressure sensor 46, and whenever the switch 47 is found closed, indicating that the pressure is below the lower limit, it drives the motor 24 until the pressure detected by the sensor 46 reaches a preset value which is lower than the upper limit established for the low pressure switch 47, whereupon the motor 24 is deenergized, thus maintaining the pressure in the accumulator 22 at substantially constant value, which is intermediate the lower limit and the preset value. The liquid braking pressure from the accumulator 22 will be hereafter referred to as a tertiary pressure.

The pressure from the accumulator 22 or a tertiary pressure is applied to the hydrobooster 5, which regulates it to a value which is proportional to the magnitude of depression of the brake pedal 3 before it is supplied to the solenoid controlled valves 64 and 65. This represents a booster pressure, which will be referred to as a secondary pressure and which is on the order of about 120% of the pressure delivered from the brake master cylinder 2.

Thus it will be seen that the accumulator or tertiary pressure and the booster or secondary pressure are supplied to the solenoid valves 64 and 65. The solenoid valve 64 includes an electrical coil, and when the coil is deenergized, the valve applies the booster pressure or secondary pressure to input ports of an intensifying solenoid valve 31 of an intensifying/reducing valve unit 312 which regulates the pressure applied to the front right wheel brake 51, and of an intensifying solenoid valve 33 of an intensifying/reducing valve unit 334 which regulates the pressure applied to the front left wheel brake 52, as shown. However, when the coil is energized, the accumulator or tertiary pressure is supplied to the input ports of the intensifying solenoid valves 31, 33 instead of the booster or secondary pressure. The solenoid controlled valve 65 applies the booster or secondary pressure to the valve 63 as shown when its coil is deenergized, but applies the accumulator or tertiary pressure, instead of the booster pressure, to the valve 63 when the coil is energized.

Solenoid controlled valves 61, 62 deliver the output pressure or the primary pressure from the brake master cylinder 2 to the front right wheel brake 51 and the front left wheel brake 52 as shown in FIG. 1 when its electrical coil is not energized, but when the coil is energized, connects these brakes to the output ports of the intensifying/reducing valve units 312, 334, respectively (or the output ports of the intensifying solenoid valves 31, 33, respectively).

The solenoid controlled valve 63 delivers the output pressure from the brake master cylinder 2, as regulated by the proportional control valve 6 (primary pressure), to input ports of intensifying/reducing valve units 356, 378 (or specifically input ports of their intensifying solenoid valves 35, 37) respectively, which regulate the pressure applied to the rear right and the rear left wheel brakes 53, 54, respectively, as shown in FIG. 1 when its electrical coil is not energized, but supplies the output pressure from the solenoid valve 65, either secondary or tertiary pressure, to the input ports of the units 356, 378 when the coil is energized.

Solenoid operated open/close valves HSV1 and HSV2 are interposed between the output ports of the intensifying/reducing valve units 312 and 334, or more specifically, the output ports of the intensifying solenoid valves 31 and 33, associated with the front right and left wheel brakes 51, 52, and the front wheel primary pressure line or the output port of the master cylinder 2. Similarly, solenoid operated open/close valves HSV3 and HSV4 are interposed between the rear wheel primary pressure line or the output port of the proportional control valve 6 and the rear right and left wheel brakes 53, 54, respectively. These solenoid valves HSV1–HSV4 are closed as shown in FIG. 1 when their coils are not energized, but are open when the coils are energized. Each of these solenoid valves HSV1–HSV4 internally includes a check valve, which is operative, when the valve is open, to apply the primary pressure to the associated wheel brake whenever the primary pressure is higher than the wheel brake pressure, but allows the wheel brake pressure to remain unchanged as a result of the application of the primary pressure whenever the primary pressure is below the wheel brake pressure. In other words, in this instance, the primary pressure is substantially not applied to the wheel brake.

It is to be noted that the solenoid valves HSV1–HSV4 are not always required in the control over the distribution of braking efforts which is initiated upon depression of the brake pedal depending on the technique employed to switch the solenoid controlled valves.

The brake pressure system shown in FIG. 1 includes a system which only applies the output pressure from the brake master cylinder 2 to the wheel brakes, a system which transmits the brake pressure during the antiskid control, a system which transmits the brake pressure during the traction control, a system which transmits the brake pressure during the control over the distribution of braking efforts, and a system which applies the pressure resulting from the control over the distribution of braking efforts and the output pressure from the brake master cylinder 2 in combination to the wheel brakes. Components which form the respective systems are shown in Tables 1 and 2 for each of the wheel brakes. It is to be noted that in these Tables, components forming each system is indicated in an order starting from the wheel brake and proceeding toward the source of brake pressure. It is also to be noted that in Tables 1 and 2 and in the drawings, "antiskid control" and "traction control" are abbreviated as "ABS control" and "TRC control", respectively, and accordingly, it should be understood that "ABS" and "TRC" stand for "antiskid" and "traction control", respectively.

TABLE 1 wheel brake pressure system for front (driven) wheels brake 51 for front right wheel FR

| foot brake pressure system | ABS control pressure system | braking effort distribution control pressure system | foot brake + distribution control combined pressure system |
| --- | --- | --- | --- |
| brake 51 | brake 51 | brake 51 | brake 51 |
| valve 61 (deenergized) | valve 61 (energized) | valve 61 (energized) | valve 61 (energized) |
| M/C-2a(Fr) | intensifying/reducing valve 312 valve 64 (deenergized) hydromaster 5 | intensifying/reducing valve 312 valve 64 (energized) accumulator 22 | intensifying/reducing valve 312<br>valve 64 (energized)<br>accumulator 22 |
| | | | HSV1 (energized) |
| | | | M/C-2a(Fr) | brake 52 for front left wheel FL

| foot brake pressure system | ABS control pressure system | braking effort distribution control pressure system | foot brake + distribution control combined pressure system |
| --- | --- | --- | --- |
| brake 52 | brake 52 | brake 52 | brake 52 |
| valve 62 (deenergized) | valve 62 (energized) | valve 62 (energized) | valve 62 (energized) |

TABLE 1-continued wheel brake pressure system for front (driven) wheels

| | | | |
|---|---|---|---|
| M/C-2a(Fr) | intensifying/reducing valve 334 valve 64 (deenergized) hydromaster 5 | intensifying/reducing valve 334 valve 64 (energized) accumulator 22 | intensifying/reducing valve 334<br>valve 64 (energized)<br>accumulator 22<br>⎦<br>HSV2 (energized)<br>M/C-2a(Fr) |

TABLE 2 wheel brake pressure system for rear (driving) wheels brake 53 for rear right wheel RR

| foot brake pressure system | ABS control pressure system | braking effort distribution control and TRC control pressure system | foot brake + braking effort distribution control pressure system |
|---|---|---|---|
| brake 53 | brake 53 | brake 53 | brake 53 |
| intensifying/reducing valve 356 (deenergized) valve 63 (deenergized) proportional control valve 6 M/C-2b(Rr) | intensifying/reducing valve 356 (on/off) valve 63 (energized) valve 65 (deenergized) hydromaster 5 | intensifying/reducing valve 356 (on/off) valve 63 (energized) valve 65 (energized) accumulator 22 | intensifying/reducing valve 356<br>valve 63 (energized)<br>valve 65 (energized)<br>accumulator 22<br>⎦<br>HSV3 (energized)<br>proportional control valve 6<br>M/C-2b(Rr) | brake 54 for rear left wheel RL

| foot brake pressure system | ABS control pressure system | braking effort distribution control and TRC control pressure system | foot brake + braking effort distribution control pressure system |
|---|---|---|---|
| brake 54 intensifying/reducing valve 378 (deenergized) valve 63 (deenergized) proportional control valve 6 M/C-2b(Rr) | brake 54 intensifying/reducing valve 378 (on/off) valve 63 (energized) valve 65 (deenergized) hydromaster 5 | brake 54 intensifying/reducing valve 378 (on/off) valve 63 (energized) valve 65 (energized) accumulator 22 | brake 54<br>intensifying/reducing valve 378<br>valve 63 (energized)<br>valve 65 (energized)<br>accumulator 22<br>⎦<br>HSV4 (energized)<br>proportional control valve 6<br>M/C-2b(Rr) |

In each of columns "antiskid control pressure system", "traction control pressure system", "distribution control pressure system" and "foot brake pressure+distribution control pressure system" shown in Tables 1 and 2, the intensifying/reducing valve units 312, 334, 356, 378 are controlled by the electronic controller 10 (FIG. 2) so as to provide either intensifying or reducing function. Specifically, when the reducing function is required, the intensifying valve 31, 33, 35 or 37 of such unit is closed by energizing their associated coil while the reducing valve 32, 34, 36 or 38 is opened by energizing their associated coil. On the contrary, when the intensifying function is required, the intensifying valves 31, 33, 35, 37 are opened by deenergizing their associated coils while the reducing valves 32, 34, 36, 38 are closed by deenergizing their coils. If a holding function is required, namely, when the current pressure is to be maintained, the intensifying valves 31, 33, 35, 37 are closed by energizing their coils while the reducing valves 32, 34, 36, 38 are closed by deenergizing their coils.

In the example shown in FIG. 1, it will be noted that the combination of the solenoid controlled valves 61, 62/63 and the intensifying/reducing valve units 312, 334/356, 378 is different between the front and the rear wheel system, but it is possible to employ the same hydraulic circuit for the rear wheel system as that used for the front wheel system.

Referring to FIG. 2, the electronic controller 10 essentially comprises a microcomputer 11, which essentially comprises CPU 14, ROM 15, RAM 16 and a timer 17. In addition, the controller 10 includes signal processing circuits 18a– 18m which energize sensors to produce detection signals, an input interface 12 which transmits detection signals or an input from an operating board 100 to the microcomputer 11, motor driver and solenoid drivers 19a–19r, and an output interface 13 which applies control signals delivered by the microcomputer 11 to the drivers 19a–19r.

Wheel speed sensors 41–44 detect the rotational speed of front right, front left, rear right and rear left wheels FR, FL, RR and RL, respectively, and the corresponding electrical signals representing the respective wheel speeds are produced by the signal processing circuits 18a–18d for input to the input interface 12. A stop switch 45 is closed during the depression of the brake pedal 3, and an electrical signal representing an open/closed or off/on condition of the stop switch 45, corresponding to the absence or occurrence of depression of the brake pedal 3, is produced by the signal processing circuit 18e for input to the input interface 12. A pressure sensor 46 detects the liquid pressure in the accumulator 22, and the signal processing circuit 18f produces a pressure signal representing the detected pressure for input to the input interface 12. The low pressure switch 47 is closed when the liquid pressure in the accumulator 22 is below the lower limit, and an electrical signal having an off (indicating a pressure above the lower limit)/on (the pressure below the lower limit) is produced by the signal processing circuit 18g for input to the input interface 12. A power pressure switch 48 is closed when the output pressure from the hydrobooster 5, which is equal to 120% the output pressure from the brake master cylinder 2 as mentioned above, is equal to or above a level corresponding to a given low pressure at which a wheel brake is substantially effective to produce a braking effort. A corresponding signal having an off (corresponding to the open condition of the switch 48 and indicating no wheel braking)/on (indicating the occurrence of a wheel braking) is produced by the signal processing circuit 18h for input to the input interface 12.

A yaw rate sensor YA detects the yaw rate of a vehicle body, and the signal processing circuit 18i produces an electrical signal representing an actual yaw rate for input to the input interface 12. A front wheel steer angle sensor θF detects an angle of rotation of a steering wheel, and the signal processing circuit 18j produces a corresponding electrical signal representing the front wheel steer angle for input to the input interface 12. A rear wheel steer angle sensor θR detects a steer angle of a rear wheel, and a signal processing circuit 18k produces a corresponding electrical signal representing a rear wheel steer angle for input to the input interface 12. An acceleration sensor (GX sensor) detects an acceleration of the vehicle body in the fore-and-aft direction, and the signal processing circuit 18l produces a corresponding electrical signal representing the acceleration in the fore-and-aft direction for input to the input interface 12. Another acceleration sensor (GY sensor) detects the acceleration of the vehicle body in the lateral direction, and the signal processing circuit 18m produces a corresponding electrical signal representing the acceleration in the lateral direction for input to the input interface 12.

Figure 3:
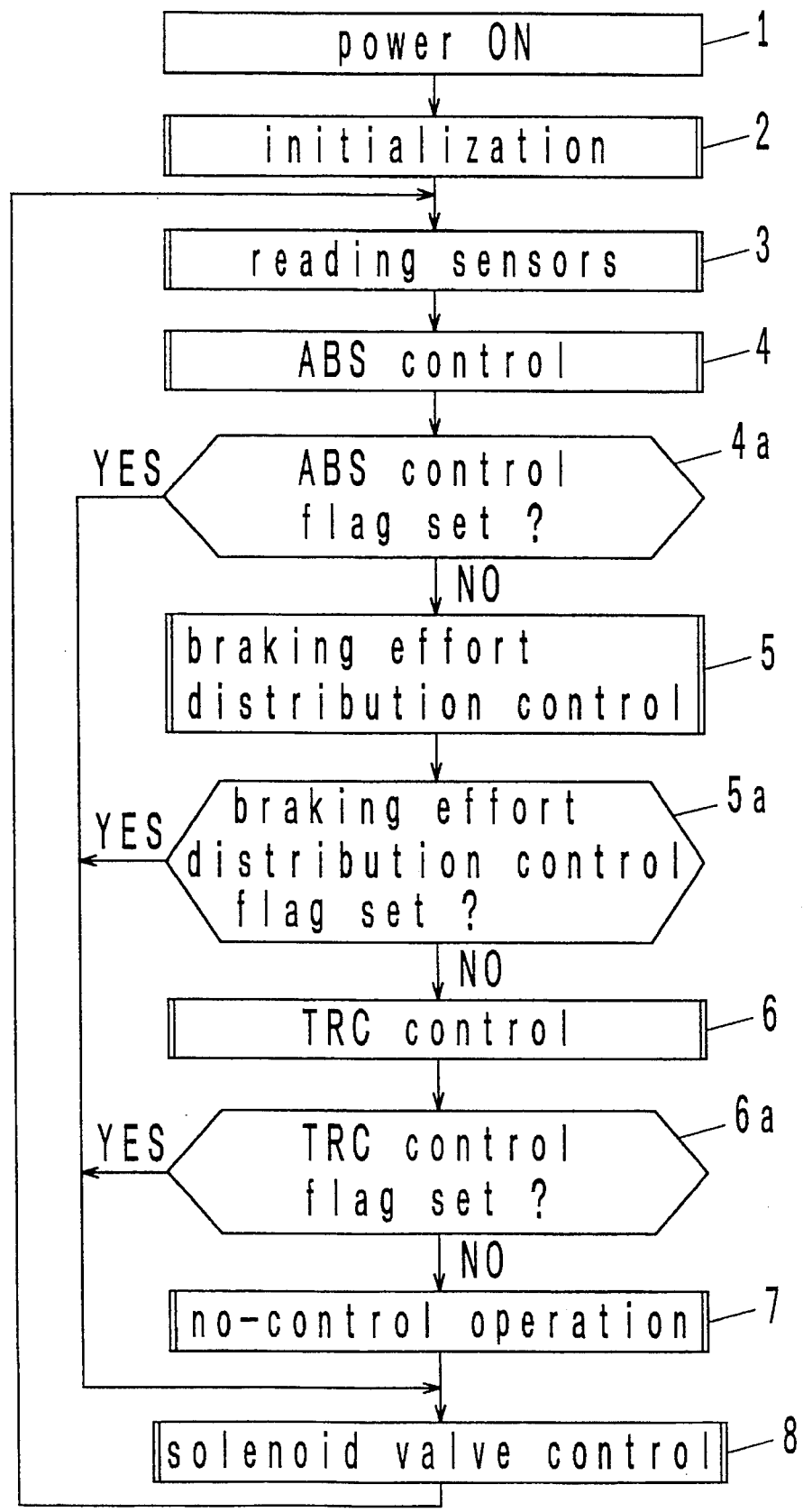
FIG. 3 is a flow chart illustrating a wheel brake pressure control by a microcomputer 11 shown in FIG. 2.

FIG. 3 shows a summary of the processing function performed by the microcomputer 11 shown in FIG. 2. When an onboard engine is started and a power supply of the onboard electrical system is turned on, operating voltages are applied to the electronic controller 10 after the system voltage has been stabilized (step 1 in FIG. 3). When the operating voltage is applied, the microcomputer 11 initializes internal registers, input and output ports and internal timers, and set up the input and the output interface 12, 13 for connection to read inputs and set up signal levels which are to be used during the standby condition (step 2). It causes the motor driver 19a to drive the motor 24 associated with the pump 21 to thereby start a control over the liquid pressure in the accumulator 22. Concurrently therewith, the microprocessor performs the processing operation from step 3 "reading sensors" to step 8 "solenoid valve control", or a control over the wheel brake pressure, and repeatedly executes such control at substantially a given time period. It will be noted from the foregoing description that during the control over the liquid pressure in the accumulator, the motor 24 associated with the pump 21 ceases to operate whenever the pressure detected by the pressure sensor 46 reaches the upper limit, while the motor 24 is again driven whenever the low pressure switch 47 is closed, indicating that the liquid pressure is equal to or below the lower limit.

During such control, which is repeated at substantially a given time period, every data from input means including sensors and switches which are connected to the input interface 12 is read to create information which is referred to in rendering decisions relating to the need of execution of either ABS control, TRC control and braking effort distribution control, the need to decompress or compress the wheel brake pressures, the duration of such control and the need to terminate such control. Principal information which is referred to in rendering such decisions in the present embodiment is as follows:

| information | source of information |
|---|---|
| actual yaw rate γ | value detected by yaw rate sensor YA |
| wheel speed VwFR | value detected by wheel speed sensor 41 |
| wheel speed VwFL | value detected by wheel speed sensor 42 |
| wheel speed VwRR | value detected by wheel speed sensor 43 |
| wheel speed VwRL | value detected by wheel speed sensor 44 |
| acceleration gx in fore-and-aft direction | value detected by fore-and-aft acceleration sensor GX |
| lateral acceleration gy | value detected by lateral acceleration sensor GY |
| front wheel steer angle θf | value detected by steer angle sensor θF |
| rear wheel steer angle θr | value detected by steer angle sensor θR |
| wheel braking applied or not | on/off of stop switch 45 |
| wheel acceleration dVwFR | calculated from previous and current detected values from wheel speed sensor 41 |
| wheel acceleration dVwFL | calculated from previous and current detected values from wheel |

| information | source of information |
|---|---|
| | speed sensor 42 |
| wheel acceleration dVwRR | calculated from previous and current detected values from wheel speed sensor 43 |
| wheel acceleration dVwRL | calculated from previous and current detected values from wheel speed sensor 44 |
| estimated vehicle speed Vso | calculated from VwFR − VwRL and previous estimated vehicle speed |
| vehicle acceleration dVs | calculated from estimated vehicle speed Vso and previous estimated vehicle speed |
| target yaw rate γ* | calculated from θf and Vso |
| yaw rate deviation Δγ | = γ* − γ |
| direction of turn of vehicle DIR | determined from γ |
| wheel slip rate SwFR | calculated from VwFR and Vso |
| wheel slip rate SwFL | calculated from VwFL and Vso |
| wheel slip rate SwRR | calculated from VwRR and Vso |
| wheel slip rate SwRL | calculated from VwRL and Vso |

After reading such information and performing required calculations, the microcomputer 11 sequentially performs ABS control (step 4), braking effort distribution control (step 5) and TRC control (step 6). In each of these blocks, if the control is not substantially executed or when a control flag is not set, it is initially necessary to determine the need to perform such control, and each control flag is set upon initiating the control. When the control is being executed or when the control flag is set, a decision is made to see if the control need to be terminated. If conditions for the termination are satisfied, the control is terminated and the control flag is reset upon completion of the termination. When none of the ABS control (step 4), braking effort distribution control (step 5) and TRC control (step 6) is performed or when none of corresponding control flags is set, the operation proceeds to "no control operation" (step 7). Each of the ABS control (step 4), braking effort distribution control (step 5), TRC control (step 6) and "no control operation" (step 7) is effective to establish control information relating to a particular mode in which the brake pressure system is to be connected, on/off of solenoid valves and the associated time durations. The solenoid valves are turned on and off in accordance with such control information at "solenoid valve control" (step 8).

I. ABS Control (step 4)

The need to decompress a wheel brake in order to suppress a wheel lock is determined for each wheel on the basis of a wheel speed and a wheel acceleration, or more accurately, a deceleration thereof. If a result of such decision indicates that there is no need to decompress, the operation proceeds to braking effort distribution control (step 5). In the event the need to decompress is determined, ABS control flag is set if it is not previously set, and a decompression rate, which is equivalent to the duty cycle of the valve opening or closing or of the energization of the associated coil, which corresponds to a deviation of a wheel slip rate with respect to a target slip rate, is calculated through a map retrieval. A solenoid valve on/off information (or the mode in which the brake pressure system is to be connected) required to decompress the pressure applied to a particular wheel brake for which the need of decompression is determined as well as the duty cycle of energization thus calculated are stored in an output register as control information. It is to be noted that the actual energization, deenergization or a switching therebetween takes place at the "solenoid valve control" (step 8) mentioned above. As a result of this, the wheel brake for which the need to decompress is determined is switched from the connection for the "foot brake pressure system" to the connection of "ABS control pressure system" as shown in Tables 1 and 2, and the reducing valve 32, 34, 36 or 38 of the intensifying/reducing valve unit 312, 334, 356 or 378 which is connected to the particular wheel brake for which the need to decompress is determined is energized in accordance with the calculated duty cycle of energization (initial decompression).

If the decompression has already been initiated as a result of the ASB control flag having been set, during the current pass of the "ABS control" (step 4), the need to intensify, reduce or hold the pressure of the wheel brake for which the decompression has been initiated is determined on the basis of a deviation of a wheel slip rate from a target slip rate as well as a wheel acceleration (or the tendency of a change in the wheel speed), and an intensifying or reducing rate, or the duty cycle of energization, is calculated. If the need to intensify is determined, the energization of the reducing valve 32, 34, 36 or 38 of the intensifying/reducing valve unit 312, 334, 356 or 378 is interrupted, and control information is established for energizing the intensifying valve 31, 33, 35 or 37 in accordance with the calculated duty cycle of energization. If the need to decompress is determined, the operation takes place in the same manner as for the initial decompression. If the need to hold is determined, control information is established which is to energize the intensifying valve continuously to close it and which deenergizes the reducing valve to close it. If conditions to terminate the ABS control are satisfied, the ABS control flag is reset. When the ABS flag is reset, unless turn-on/off of solenoid valves take place according to other controls (step 5 or 6), the operation proceeds to "no control operation" (step 7) where control information is established to connect the wheel brakes according to the "foot brake pressure system" shown in Tables 1 and 2, followed by "solenoid valve control" (step 8) where the connection according to the "foot brake pressure system" is actually made, or all the solenoid valves are deenergized.

II. Braking Effort Distribution Control (step 5)

Figure 4:
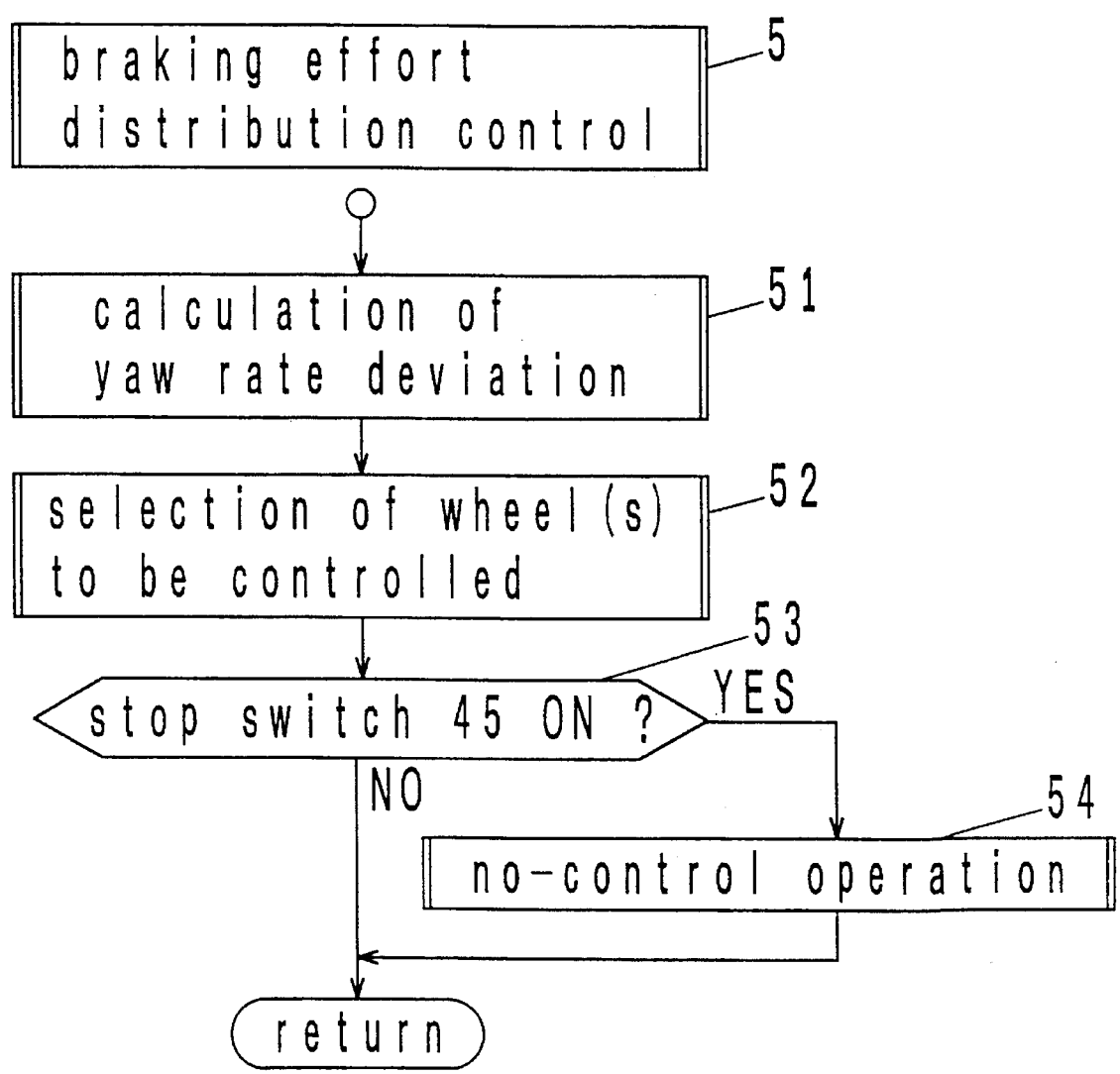
FIG. 4 is a flow chart showing "control over the distribution of braking efforts" (5), shown in FIG. 3, in detail.
Figure 5:
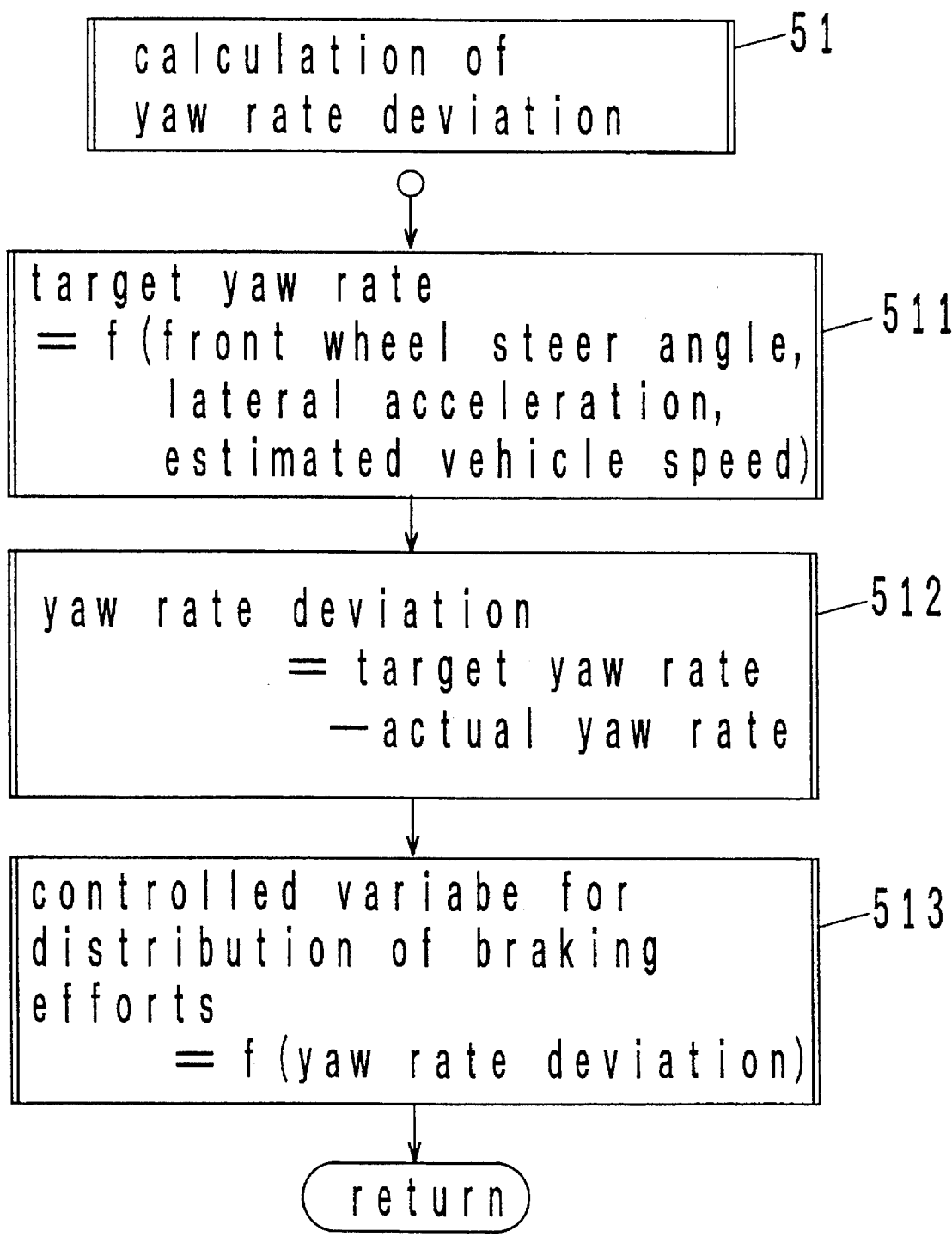
FIG. 5 is a flow chart showing "calculation of yaw rate deviation" (51), shown in FIG. 4, in detail.
Figure 6:
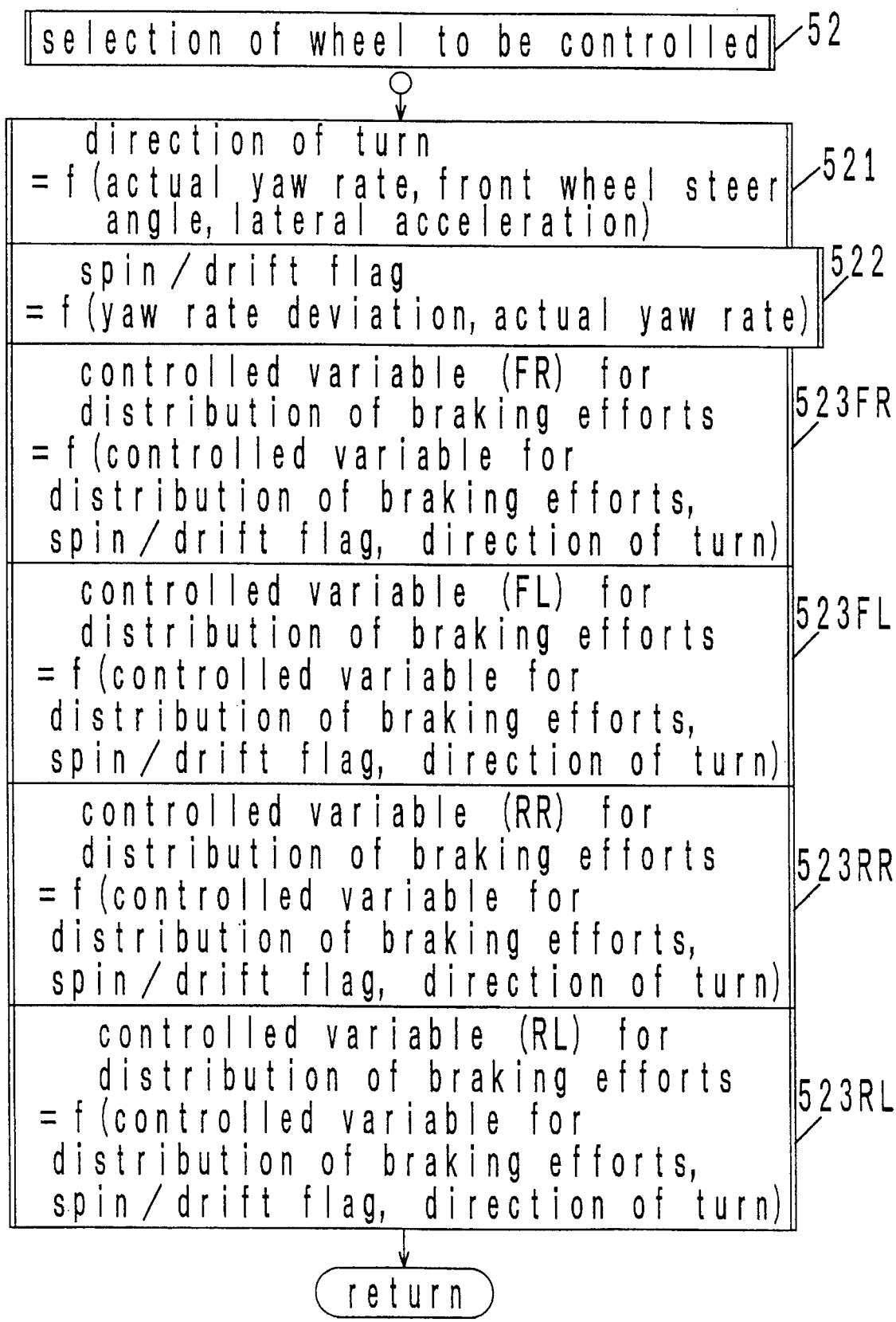
FIG. 6 is a flow chart showing "selection of wheels to be controlled" (52), shown in FIG. 4, in detail.

The detail of the braking effort distribution control (step 5) is shown in FIG. 4. Initially, "calculation of yaw rate deviation" is executed (step 51), the detail of which is shown in FIG. 5. A target yaw rate γ* is calculated on the basis of a front wheel steer angle θf, a lateral acceleration gy and an estimated vehicle speed Vso (step 511), thus deriving a yaw rate deviation γ*−γ (step 512). A controlled variable for the four wheels as a whole is calculated on the basis of the yaw rate deviation γ*−γ (step 513), followed by "selection of wheel to be controlled" (step 52), the detail of which is shown in FIG. 6. At step 52, the direction of turn (DIR) of a vehicle is determined in terms of an actual yaw rate γ, a lateral acceleration gy and a front wheel steer angle θf (step 521), and a spin/drift flag is calculated from the yaw rate deviation γ*−γ and the actual yaw rate γ (step 522) followed by calculating a controlled variable for the distribution of braking efforts for each of the wheels (steps 523FR–RL). The controlled variable of each wheel for the distribution of braking efforts is expressed in terms of the duty cycle of energization of the intensifying valve of the intensifying/reducing valve unit, or an opening as averaged over a time sequence, and the duty cycle of energization of the reducing valve or an opening as averaged over the time sequence. It is to be noted that the decompression is significant in releasing the brake pressure after it has been intensified.

If it is found that the control variable for the distribution of braking efforts (which assumes a positive value for an intensifying operation and a negative value for a reducing operation, but here the absolute magnitude is considered) for any one of the wheel brakes is equal to or greater than a preset value, a braking effort distribution control flag is set.

A connection according to the "braking effort distribution control pressure system" indicated in Tables 1 and 2 is established for the particular wheel brake for which the controlled variable is found to be equal to or greater than the preset value, and control information is established including the on/off conditions of the solenoid valves and the duty cycle of energization in order to intensify or reduce the pressure in accordance with the calculated duty cycle. An actual energization, deenergization or a switching therebetween takes place at "solenoid valve control" (step 8) as mentioned previously. In this manner, the wheel brake pressure system is switched from the connection according to the "foot brake pressure system" to the connection according to the "braking effort distribution control pressure system" as indicated in Tables 1 and 2. Accordingly, the intensifying or reducing valve of intensifying/reducing valve unit 312, 334, 356 or 378 connected to the particular wheel brake for which the need to intensify or reduce the pressure is determined is energized in accordance with the calculated duty cycle. Specifically, when the decompression is required, the reducing valve is energized in accordance with the duty cycle while the intensifying valve is energized continuously. When the intensification is required, the intensifying valve is energized in accordance with the calculated duty cycle while the reducing valve remains deenergized continuously. If it is found that the controlled variables for all the wheel brakes are less than a preset value, the braking effort distribution control flag is reset. When this flag is reset, unless turn-on/off of the solenoid valves take place according to another control (step 6), the operation proceeds to "no control operation" (step 7) where control information is established to connect the wheel brake according to the "foot brake pressure system" indicated in Tables 1 and 2, and the connection according to the "foot brake pressure system" is executed at "solenoid valve control" (step 8). Thus, all the solenoid valves are deenergized.

Even when "braking effort distribution control pressure system" as indicated in Tables 1 and 2 is made for the wheel brake during the "selection of wheel to be controlled" (step 52) and on/off information for the solenoid valves are established so as to correspond to the controlled variables as calculated, if the stop switch 45 is turned on as a result of depression of the brake pedal by the driver, the braking effort distribution control flag is reset during the "no control operation" (step 54 shown in FIG. 4). Thereupon, the operation proceeds to the "no control operation" (step 7 shown in FIG. 3) where control information is established in which the "foot brake pressure system" as indicated in Tables 1 and 2 is to be established for the wheel brake, followed by the "solenoid valve control" (step 8) where the connection according to the "foot brake pressure system" is actually made or all the solenoid valves are deenergized. In this manner, a braking operation by the driver is predominant over the braking effort distribution control.

Figure 7:
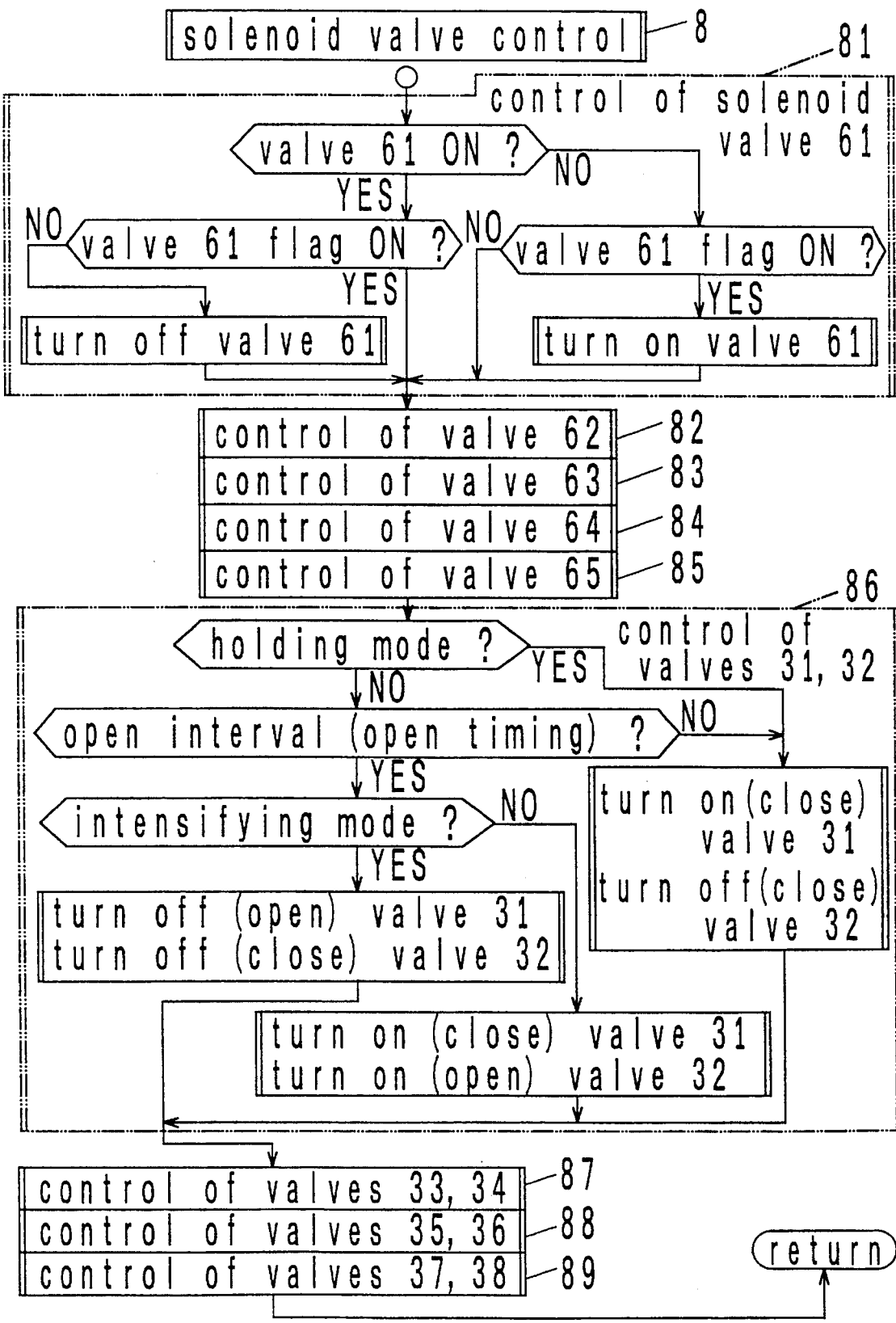
FIG. 7 is a flow chart showing "control of solenoid operated valves" (8), shown in FIG. 3, in detail.
Figure 8:
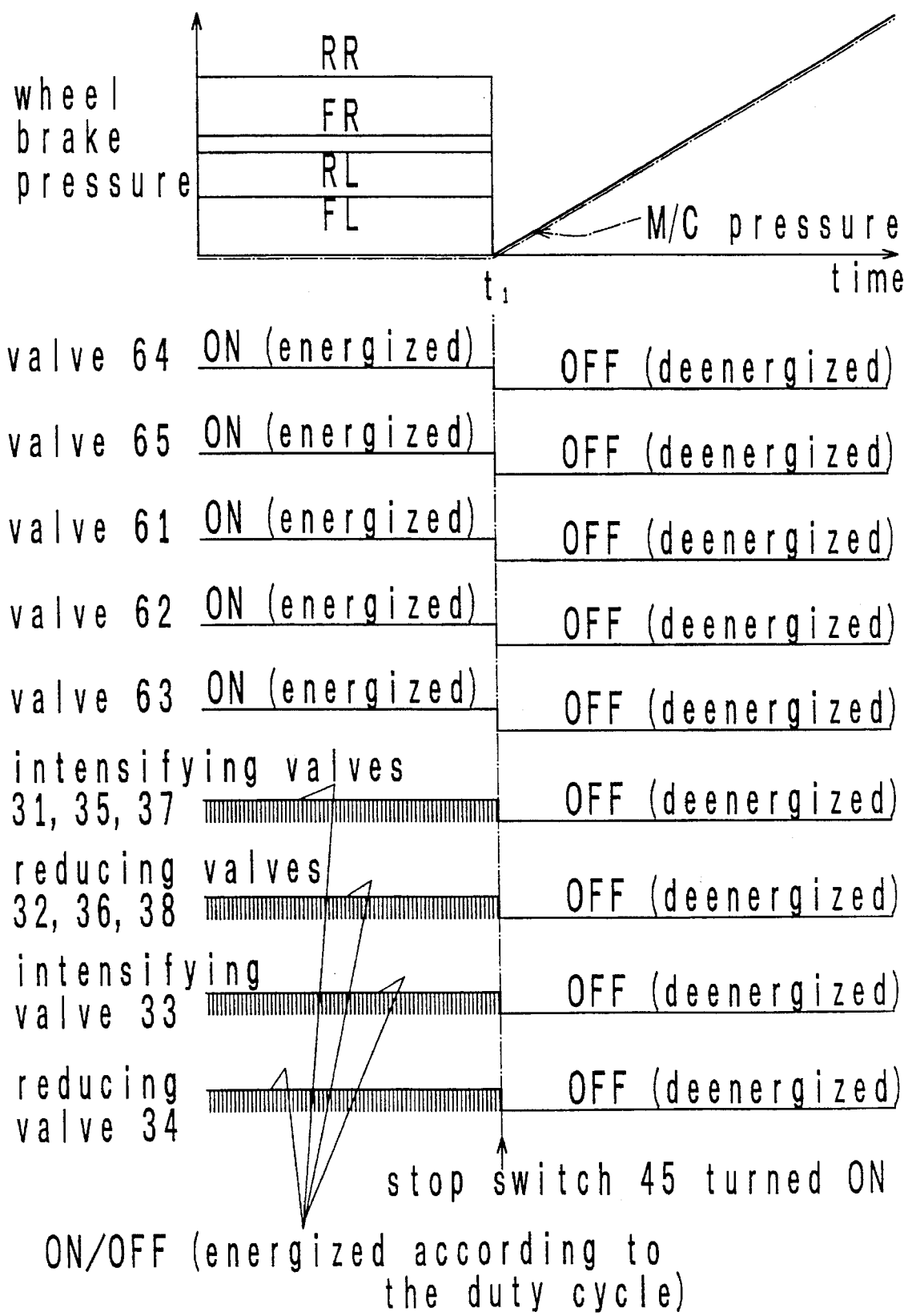
FIG. 8 is a series of timing charts schematically illustrating the on/off timing of various solenoid controlled valves shown in FIG. 1 which are controlled by "control over the distribution of braking efforts" (5) shown in FIG. 4, and the resulting wheel brake pressures.

Creation of control information as a result of the braking effort distribution control (step 5), the turn-on and -off of solenoid valves according to the "solenoid valve control" (step 8 in FIG. 3, and the detail is illustrated in FIG. 7) on the basis of such control information as well as the resulting wheel brake pressures are illustrated in FIG. 8.

III. TRC Control (step 6)

During this control, the need to brake wheels in order to suppress a slip of driving wheels as they are accelerated, and if such need is found, the rate at which the wheel brake pressure is to be intensified (or the duty cycle of energization of the intensifying/reducing valve) corresponding to the wheel slip rate and the wheel acceleration are calculated from the slip rate of driving wheels, which are the rear wheels RR and RL in the present embodiment, and the wheel acceleration. When the need to brake the wheel is found, a TRC control flag is set, and in order to establish the connection according to the "TRC control pressure system" indicated in Table 2 for the rear wheel brake pressure system, a corresponding turn-on and -off of the solenoid valves and the duty cycle of energization of the intensifying/reducing valves (thus control information) are set up. If the need to brake wheel is found absent, the TRC control flag is reset. As a result of the creation of control information according to the TRC control (step 6) and the turn-on and -off of the solenoid valves according to the "solenoid valve control" (shown at step 8 in FIG. 3, and the detail is illustrated in FIG. 7) based on such control information, the braking pressures applied to the driving wheels are repeatedly intensified or reduced in accordance with the slip rate and the acceleration of the driving wheels, thereby suppressing a slip due to the acceleration.

IV. No Control Operation (step 7)

Control information is created at this step in which control information for establishing a connection according to the "foot brake pressure system" indicated in Tables 1 and 2 for all the wheel brakes is created. In this instance, all the solenoid valves are deenergized, which is equivalent to establishing the connection according to the foot brake pressure system.

V. Solenoid Valve Control (step 8)

The individual solenoid valves shown in FIG. 1 are either energized or deenergized using the above control information as a command which control these valves. This control is shown in detail in FIG. 7. Except for the intensifying/reducing valve units 312, 334, 356 and 327 (where the valve unit 312, for example, comprises the intensifying valve 31+reducing valve 32), the solenoid valves are simply turned on or off, as indicated at steps 81 to 85 in FIG. 7, in accordance with the control information. It is to be understood that the detail of each of the steps 82 to 85 shown in FIG. 7 is equivalent to step 81 where the solenoid valve 61 is replaced by one of solenoid valves 62, 63, 64 and 65, respectively.

As mentioned previously, for each of the intensifying/reducing valve unit 312, 334, 356 and 378, the rate at which the pressure is intensified or reduced is basically controlled in accordance with the duty cycle of energization. In addition, each of them operates to maintain or hold the current brake pressure by simultaneously closing the intensifying valve (e.g. 31) and the reducing valve (e.g. 32). Accordingly, a control over the energization of the intensifying/reducing valve units 312, 334, 356 and 378, each comprising a pair of intensifying and reducing valves, is required over the intensifying mode where the intensifying valve is either opened or closed and concurrently the reducing valve is continuously closed, the decompression mode where the reducing valve is either opened or closed and concurrently the intensifying valve is continuously closed and the holding mode where the intensifying valve is closed as is the reducing valve.

Considering step 86 where the intensifying/reducing valve unit 312 is controlled, for example, if the holding mode is commanded, the intensifying valve 31 is closed by energizing its solenoid while the reducing valve 32 is closed by deenergizing its solenoid. It is to be noted that when the intensifying for the decompression mode is specified, data which specifies the duty cycle of the energization or the valve open interval dt during a constant period T is specified. Accordingly, when such data is created, T timer is started, even though this is not shown in the flow chart of FIG. 7, to thereby create "open interval" information, indicating an interval during which the intensifying valve is deenergized for the intensification or the reducing valve is energized for the decompression, and dt timer is started. When dt timer times out, such information is changed to "close interval" information, indicating an interval during which the intensifying valve is energized for the intensification or the reducing valve is deenergized for the decompression. When T timer times out, this timer is restarted to create "open interval" information, restarting dt timer. Such operation is repeated until control information is modified. As long as the open interval information is present, the intensifying valve 31 is deenergized or open while the reducing valve 32 is also deenergized or closed if the intensifying mode is specified, and the intensifying valve 31 is energized or closed while the reducing valve 32 is energized or open if the decompression mode is specified. As long as the closed interval information is present, the intensifying valve 31 is closed by energizing its solenoid while the reducing valve 32 is closed by deenergizing its solenoid just in the same as when the "holding mode" is specified. It is to be noted that the detail of each of steps 87 to 89 shown in FIG. 7is equivalent to the detail of the step 86 mentioned above where the intensifying valve 31 and the reducing valve 32 of the intensifying/reducing valve unit 312 are replaced by intensifying and reducing valves of each of the intensifying/reducing valve units 334, 356 and 378, respectively.

In the first embodiment described above, the microcomputer 11 executes the braking effort distribution control shown in FIG. 4, or in other words, all the wheel brakes are switched to the connection according to the "foot brake pressure system" indicated in Tables 1 and 2, thereby terminating the braking effort distribution control, in response to the turn-on of the stop switch 45 which is in turn responsive to the depression of the brake pedal 3. Accordingly, the pressures applied to all the wheel brakes correspond to the degree of the depression of the brake pedal 3 by the driver after time $t_1$ when the stop switch 45 is turned on, as indicated in FIG. 8.

First Modification of the First Embodiment

Figure 9:
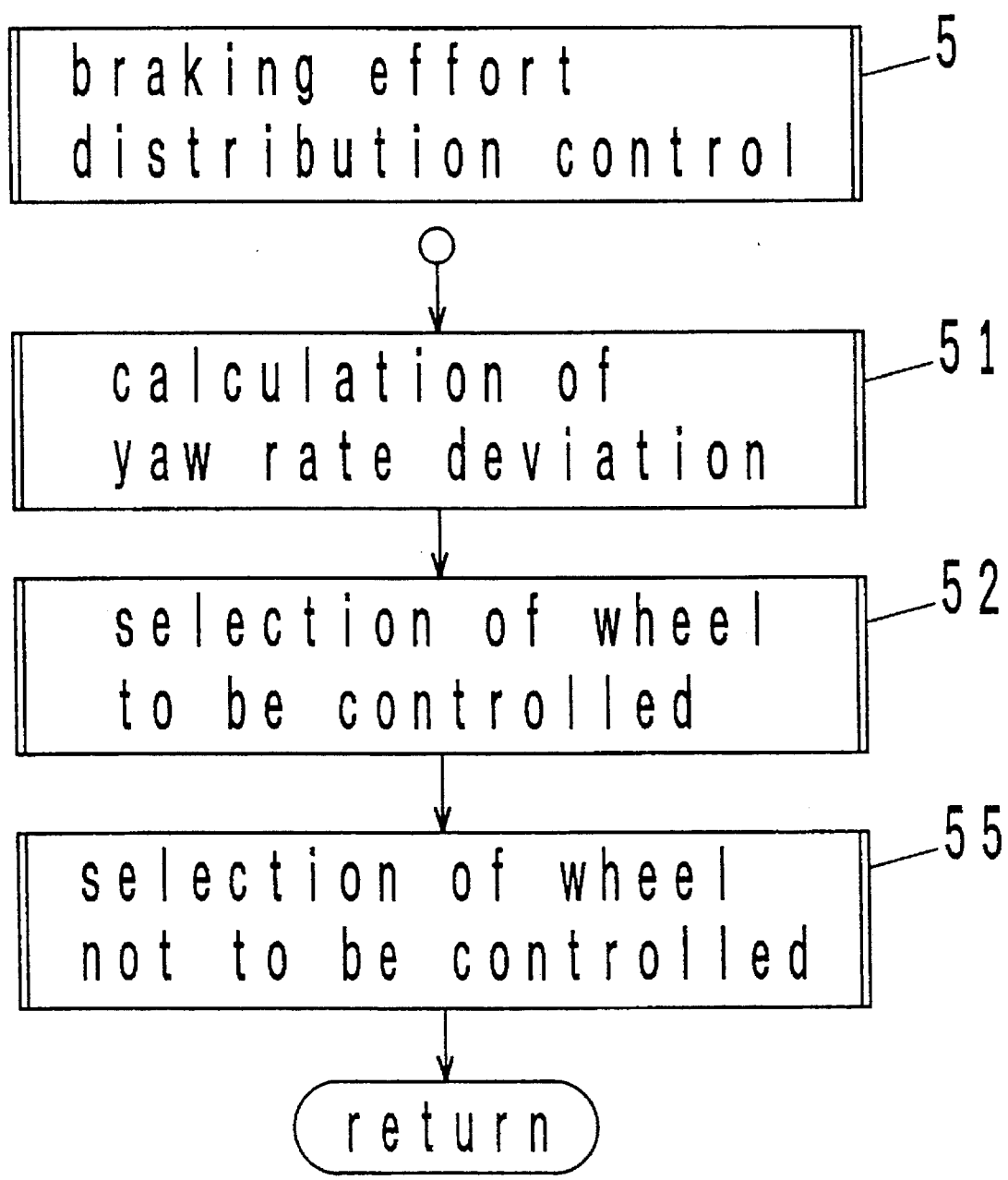
FIG. 9 is a flow chart showing the detail of "control over the distribution of braking efforts" (5) according to a first modification of the first embodiment.

In this modification, the "braking effort distribution control" shown at step 5 in FIG. 4 is modified to that shown in FIG. 9, and in other respects, the arrangement and operation is similar to that of the preceding embodiment.

Figure 10:
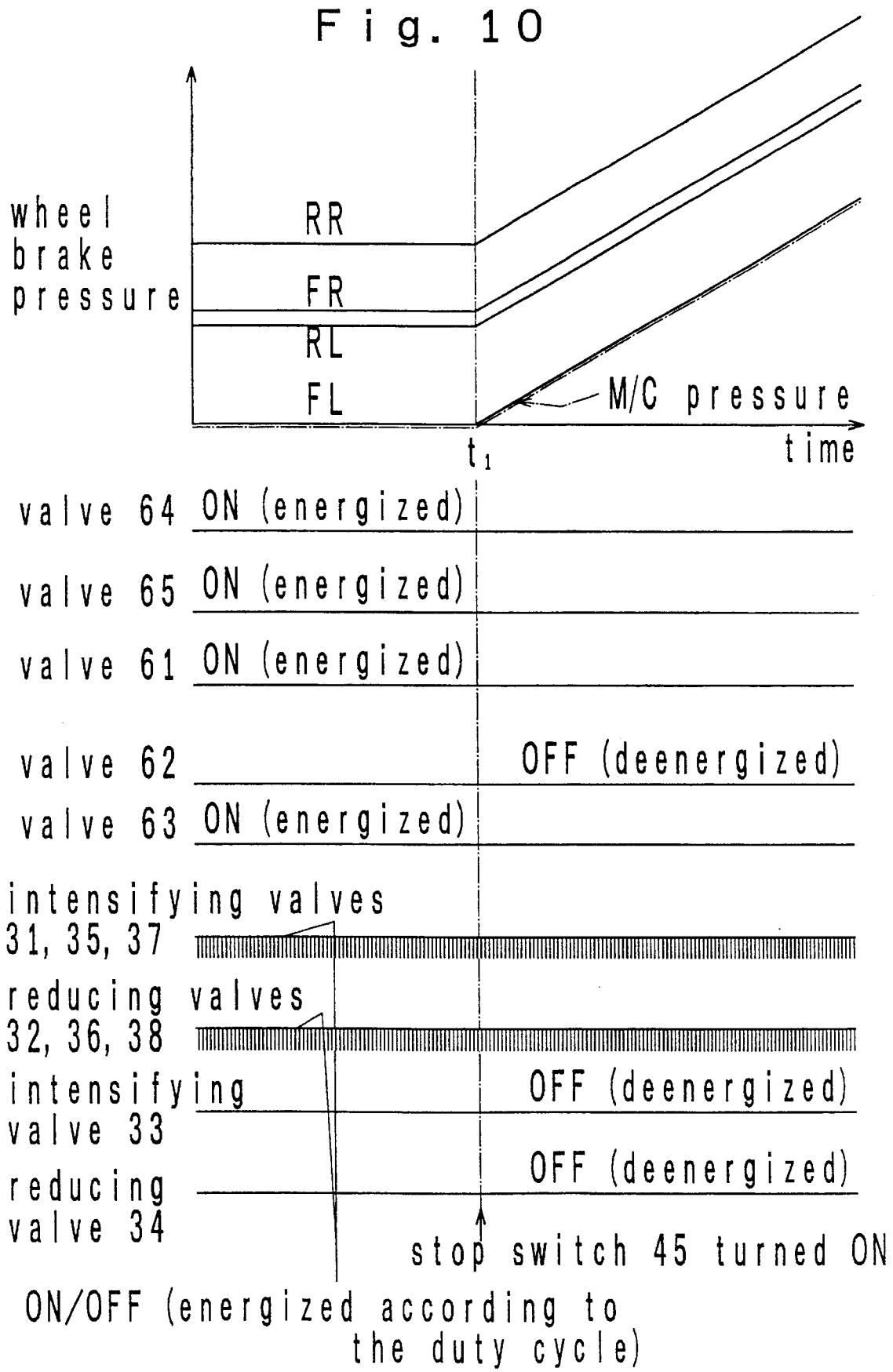
FIG. 10 is a series of timing charts, illustrating the on/off timing of various solenoid controlled valves shown in FIG. 1 which are controlled by the "control over the distribution of braking efforts" (5) shown in FIG. 9, and the resulting wheel brake pressures.

Referring to FIG. 9, the distribution control (step 5) remains the same as in FIG. 4 up to the "selection of wheels to be controlled" (step 52). However, in this first modification, when the controlled variable which is determined for each wheel for the distribution of braking efforts is calculated at "selection of wheels to be controlled" (step 52 in FIG. 6), the operation then proceeds to "selection of wheels not to be controlled" (step 55) where the wheel brake having a minimum absolute magnitude of the controlled variable is selected as a wheel not to be controlled, and as far as this wheel brake is concerned, control information is established so as to achieve a connection according to the "foot brake pressure system" while control information for the remaining wheel brakes comprises the controlled variable as calculated at "selection of wheels to be controlled" (step 52) plus a braking effort which is calculated from the actual slip rate of the wheel or wheels not to be controlled. As a result of such modification, at least one of the wheel brakes is always not controlled as far as the distribution of braking efforts is concerned, and in this manner, the control over the distribution of braking efforts is compatible while securing an amount of brake operation by the driver as referenced to this wheel. The turn-on/off of the solenoid valves according to the braking effort distribution control of the first modification and the resulting wheel brake pressures are shown in FIG. 10.

Second Modification of the First Embodiment

Figure 11:
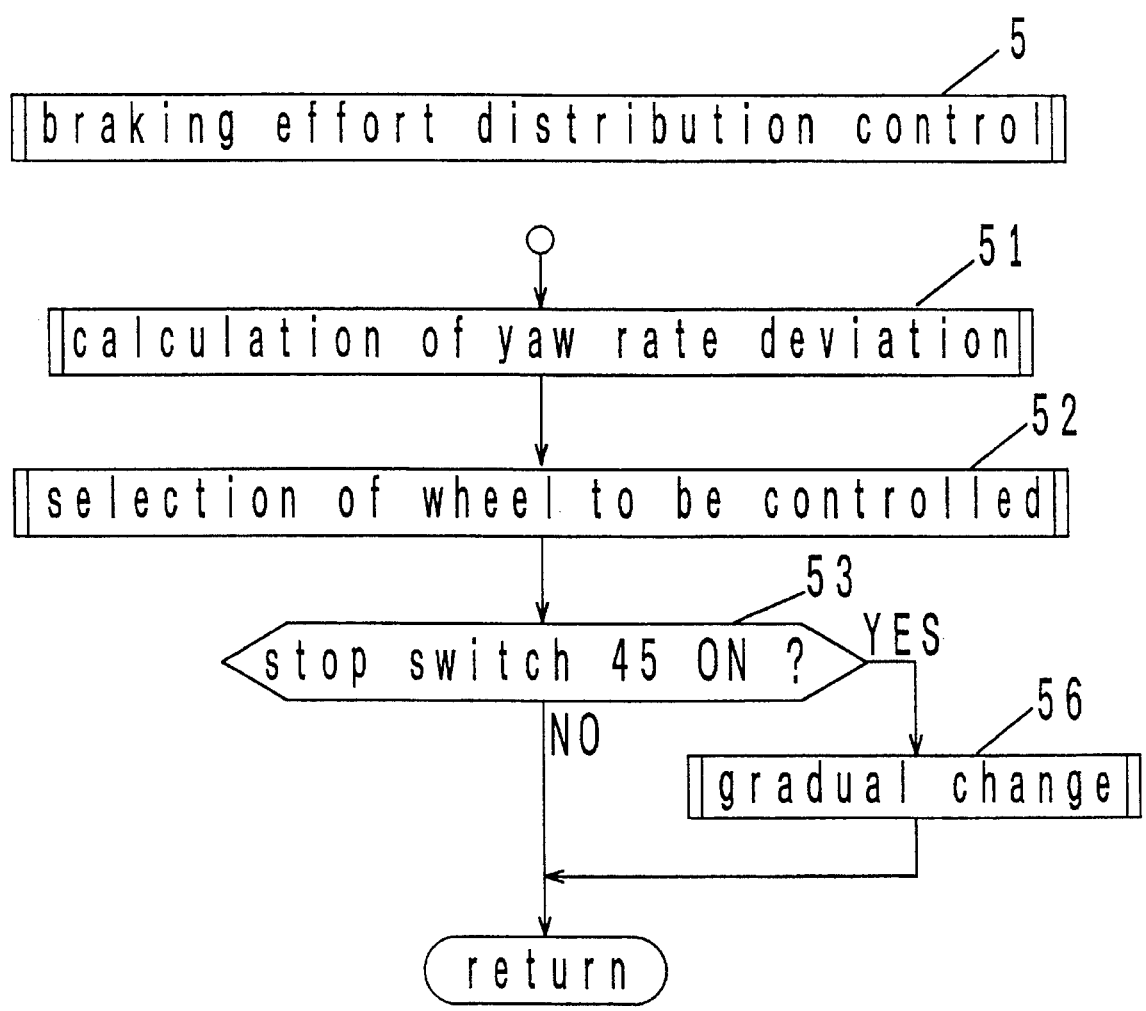
FIG. 11 is a flow chart showing the detail of "control over the distribution of braking efforts" (5) according to a second modification of the first embodiment.

In this modification, the first embodiment is modified by replacing the "braking effort distribution control" (step 5 of FIG. 4) by one shown in FIG. 11, and in other respects, the arrangement and operation remains the same as in the first embodiment. The "braking effort distribution control" (step 5) shown in FIG. 11 remains the same as shown in FIG. 4 up to the "selection of wheels to be controlled" (step 52) and as regards the termination of the braking effort distribution control of the wheel brake having the minimum controlled variable in response to turn-on of the stop switch 45. However, in the second modification, the braking effort distribution control for the remaining three wheel brakes is continued if the stop switch 45 is turned on. Thus, "no control operation" (step 54) of the first embodiment is replaced by "gradual change" (step 56). Thus, in the second modification, when the braking effort distribution control for the wheel brake having the minimum controlled variable is terminated in response to turn-on of the stop switch 45, the "gradual change" (step 56) is executed. The detail of this operation is shown in FIG. 12.

Figure 12:
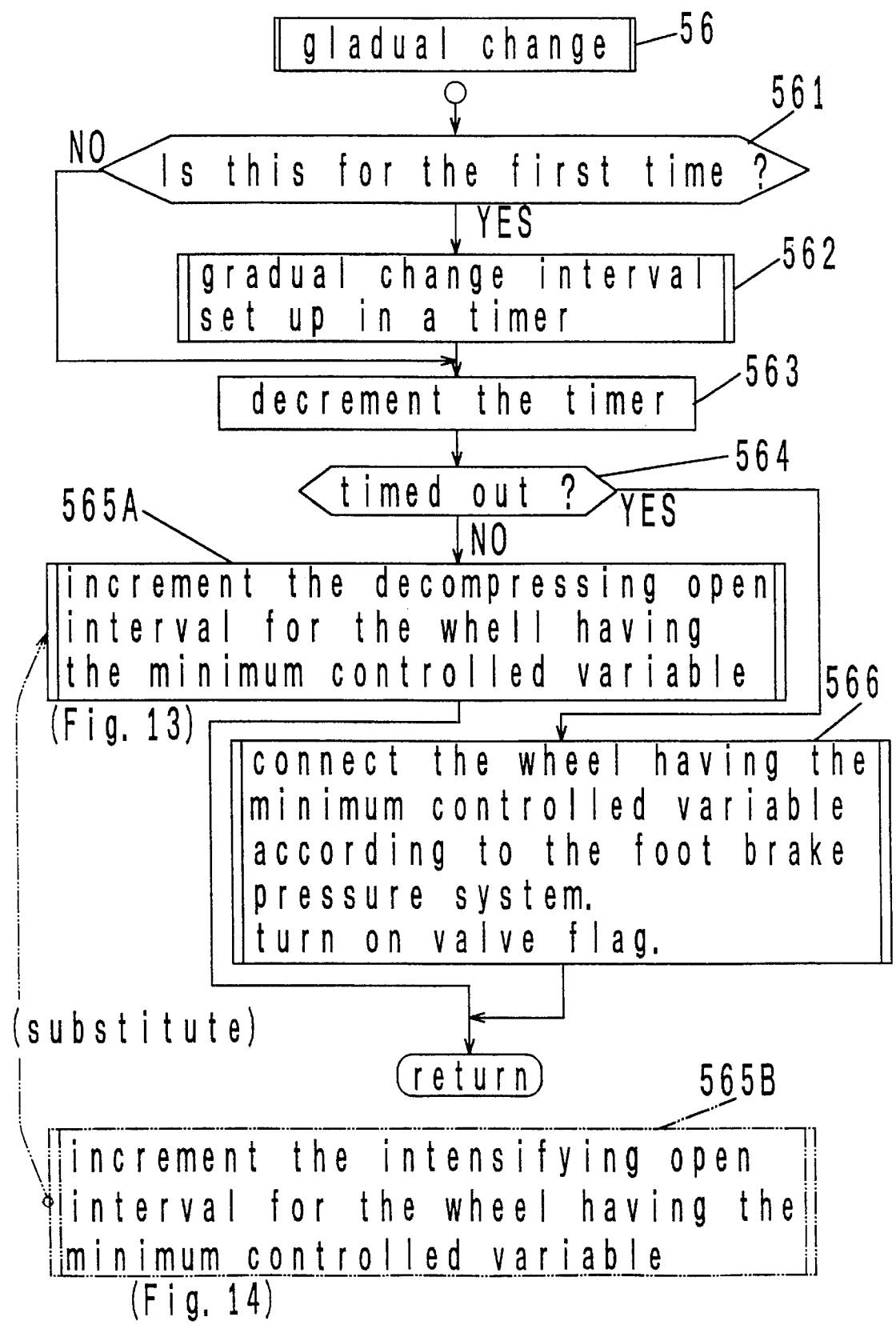
FIG. 12 is a flow chart showing the detail of "gradual change" (56) shown in FIG. 11.
Figure 13:
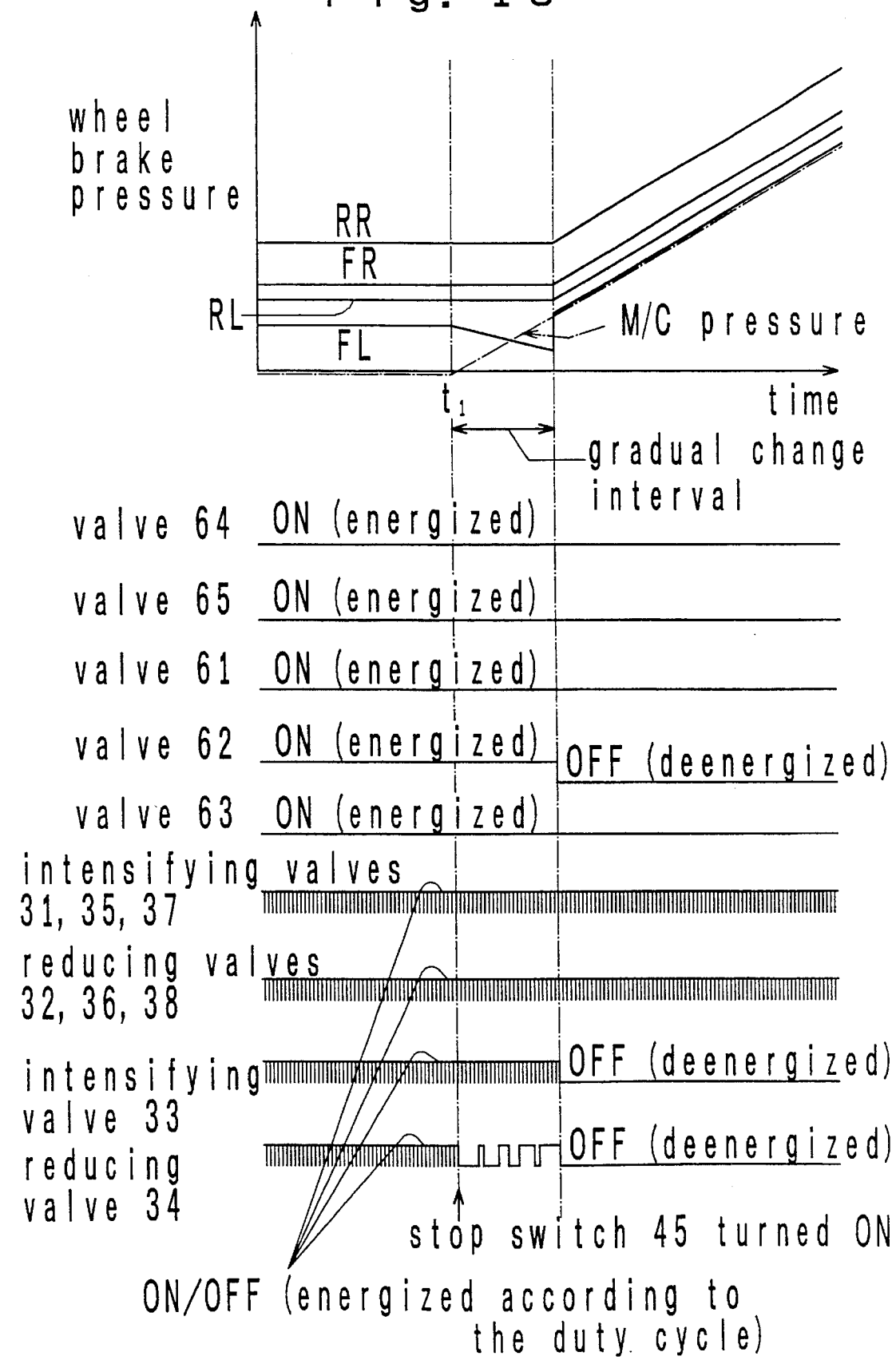
FIG. 13 is a series of timing charts schematically indicating the on/off timing of various solenoid controlled valves shown in FIG. 1 which are controlled by the "control over the distribution of braking efforts" (5) shown in FIG. 11, and the resulting wheel brake pressures.

Referring to FIG. 12, upon entering the "gradual change" (step 56), a given time interval is initially preset in a timer, which is started, thereby creating control information in which a decompression mode is established for the wheel brake having the minimum controlled variable in which the duty cycle of energization is initially small or the opening of the reducing valve is small in a time sequence. During subsequent pass through the "gradual change" (step 56), the duty cycle of energization is successively updated to a larger value (steps 562–564, 565A). When the timer times out, control information which establishes the connection according to the "foot brake pressure system" is established for the wheel brake having a minimum controlled variable (step 566). According to the second modification, when the brake pedal 3 is depressed and the stop switch 45 is turned on, the braking effort distribution control for one of the wheel brakes is gradually brought to a stop while continuing the braking effort distribution control to secure an amount of brake operation by the driver about this wheel as a reference. The turn-on/off of the solenoid valves according to the braking effort distribution control according to the second modification and the resulting wheel brake pressures are shown in FIG. 13. As shown in FIG. 13, the pressure applied to the wheel brake for which the braking effort distribution control ceases decreases gradually and smoothly over a given time interval, reducing a fluctuation in the brake pressure upon switching.

Third Modification of the First Embodiment

Figure 14:
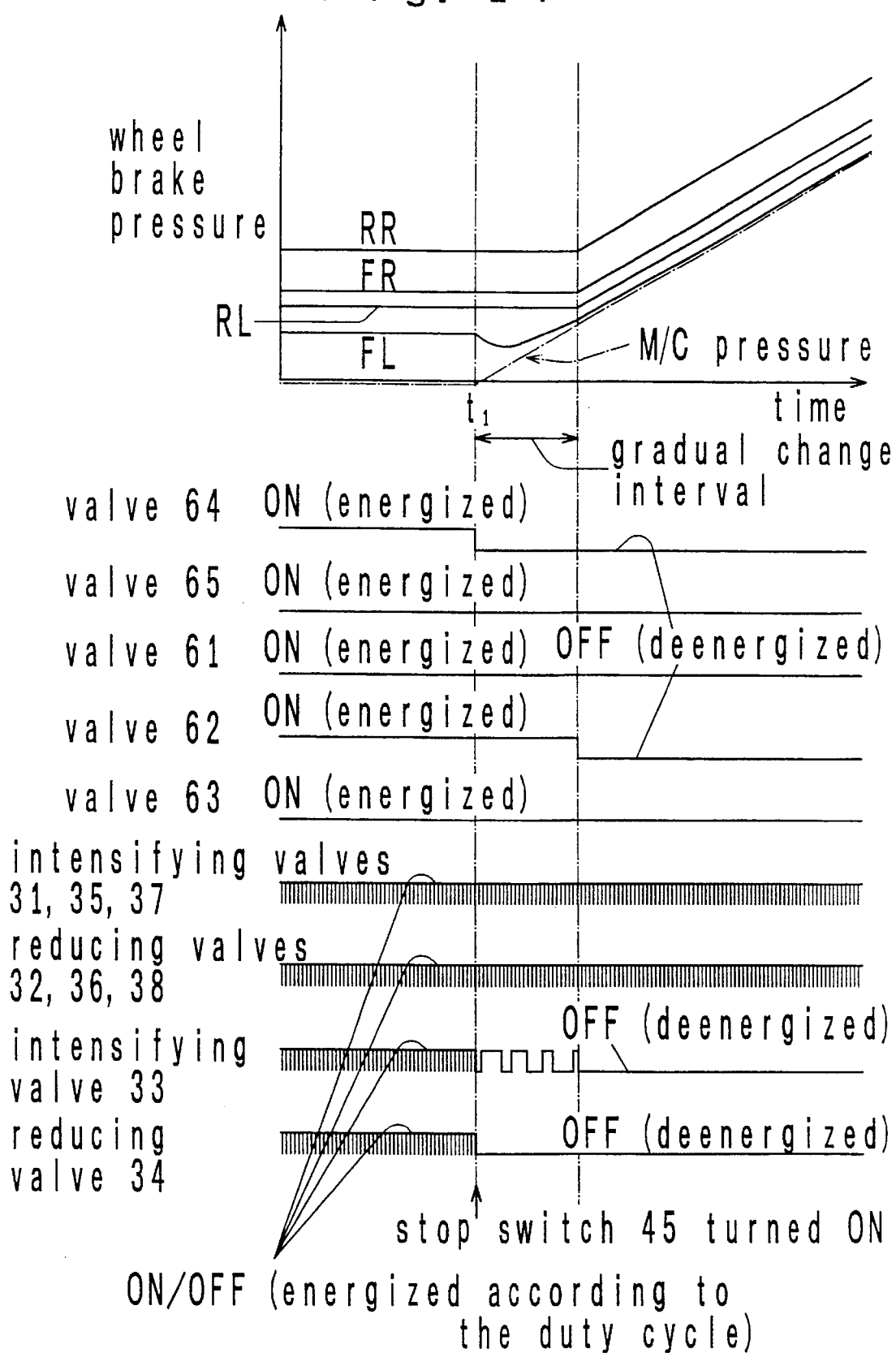
FIG. 14 is a series of timing charts schematically indicating the on/off timing of various solenoid controlled valves shown in FIG. 1 and the resulting wheel brake pressures when these valves are controlled according to a third modification in which "increment decompression time interval for wheel having smallest controlled variable" (565A) shown in FIG. 12 is replaced by "increment compression time interval of wheel having smallest controlled variable" (565B) shown in the same Figure.

In a third modification, "increment open decompression time for the wheel having the minimum controlled variable" (step 565A) shown in FIG. 12 is replaced by "increment intensifying time for the wheel having the minimum controlled variable" (step 565B) which is indicated in FIG. 12 in phantom lines. In other respects, the arrangement and the operation remain substantially similar as in the second modification. In the third modification, when the braking effort distribution control for the wheel brake having the minimum controlled variable is terminated in response to turn-on of the stop switch 45, the "gradual change" (step 56) is executed. During an initial pass through the "gradual change", a given time interval is preset in a timer, which is started in order to create control information in which an intensifying mode which initially has a high value for the duty cycle of energization or a small opening of the intensifying valve as viewed in a time sequence is established for the wheel brake having the minimum controlled variable. During a subsequent pass through the "gradual change", the duty cycle of energizaton is successively updated to a smaller value (steps 562–564 and 565B). When the timer times out, control information is created (step 566) in which the connection according to the "foot brake pressure system" is established for the wheel brake having the minimum controlled variable. According to the third modification, when the brake pedal 3 is depressed and the stop switch 45 is turned on, the braking effort distribution control for one of the wheel brakes is gradually stopped while the braking effort distribution control continues so as to secure an amount of brake operation by the driver about this wheel as a reference. The turn-on/off of the solenoid valves according to the distribution control of the third modification and the resulting wheel brake pressures are shown in FIG. 14. As indicated in FIG. 14, the pressure applied to the wheel brake for which the distribution control is stopped smoothly rises over a given time interval, reducing any fluctuation in the brake pressure applied to the wheel brake upon switching. This gradual change according to the third modification takes place when the wheel which is disposed symmetrically to the wheel having the minimum controlled variable (wheel FR symmetrical to wheel FL in the example shown in FIG. 14) should hold its pressure.

Fourth Modification of the First Embodiment

Figure 15:
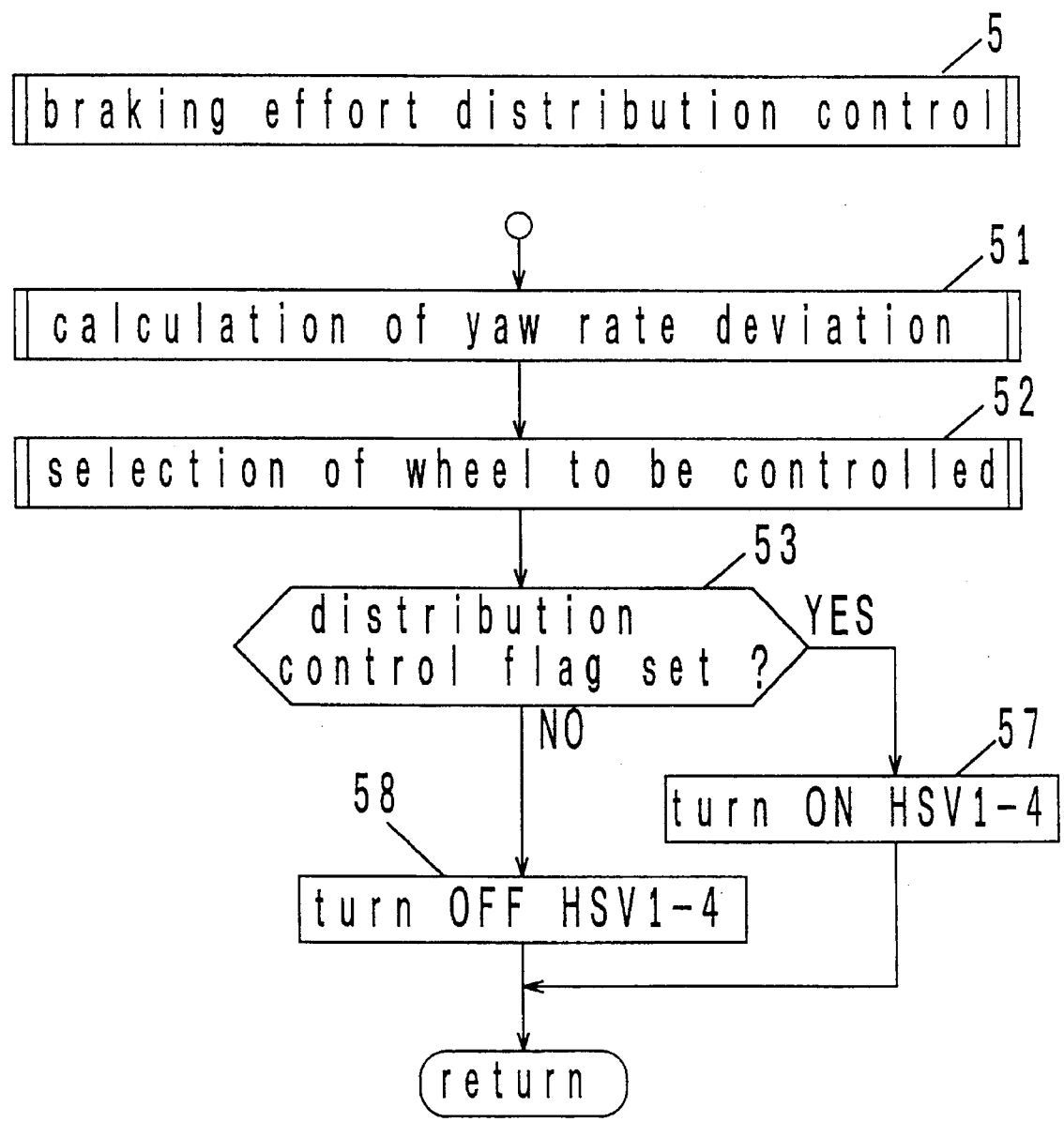
FIG. 15 is a flow chart showing the detail of "control over the distribution of braking efforts" (5) according to a fourth modification of the first embodiment.
Figure 16:
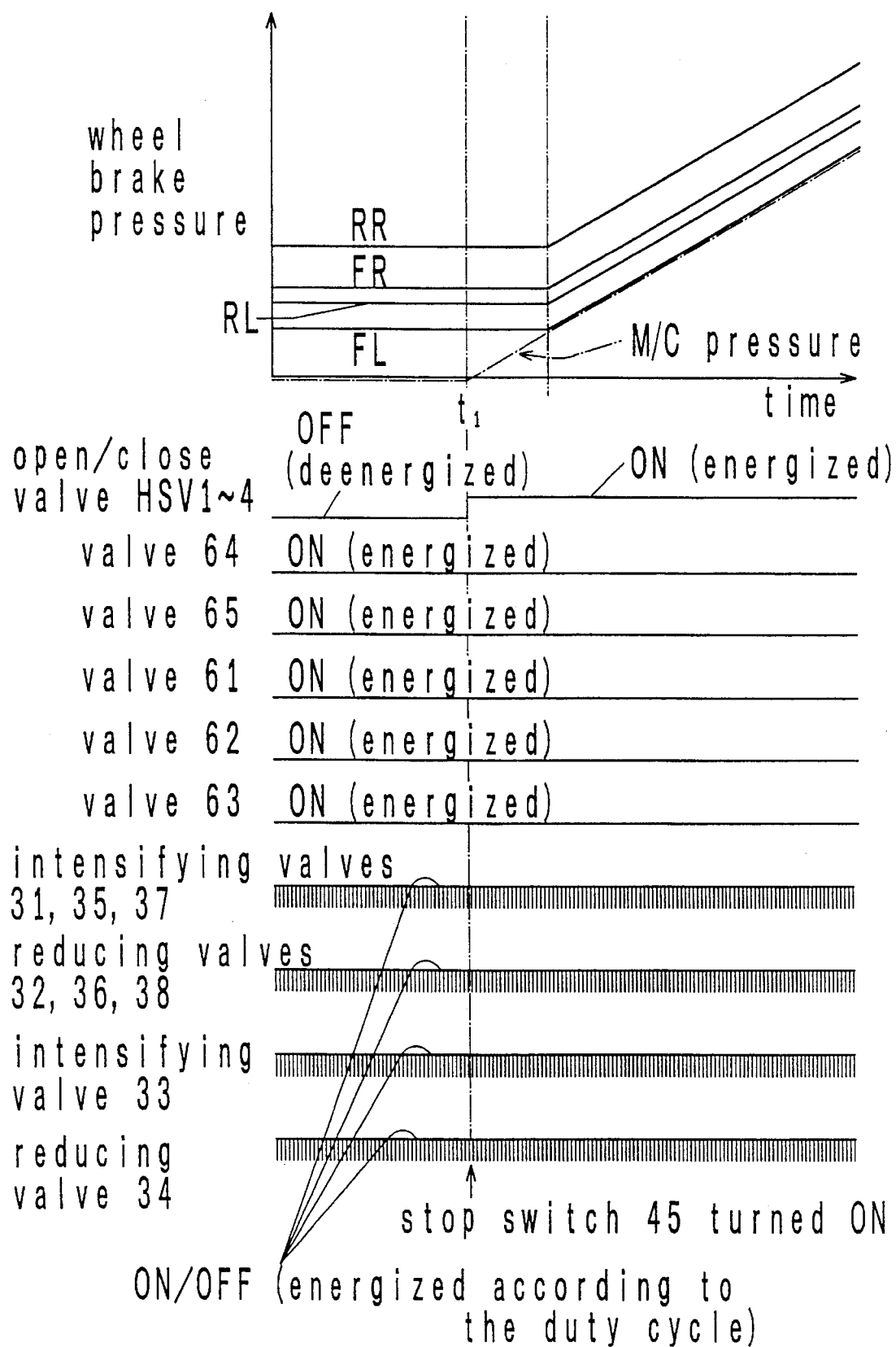
FIG. 16 is a series of timing charts schematically indicating the on/off timing of various solenoid controlled valves shown in FIG. 1 which are controlled by the "control over the distribution of braking efforts" (5) shown in FIG. 15 and the resulting wheel brake pressures.

In this modification, "braking effort distribution control" shown at step 5 in FIG. 14 is replaced by one shown in FIG. 15, and in other respects, the arrangement and the operation remain the same as in the first embodiment. The control remains the same as in FIG. 4 up to "selection of wheels to be controlled" (step 52). However, in this fourth modification, the control continues for a maximum of four wheels according to the "selection of wheels to be controlled" independently from on/off condition of the stop switch 45 or independently from the depression of the brake pedal. However, when a distribution control flag is set, HSV1–4 are turned on (step 57), whereby whenever the pressure of the master cylinder becomes equal to the pressure applied to the wheel brake having the minimum controlled variable as a result of a brake pedal operation by the driver, only this wheel is automatically switched to the foot brake pressure system by activating the HSV's. Control information for the remaining wheel brakes is created by using the controlled variable as calculated during the "selection of wheels to be controlled" (step 52), to which a braking effort as calculated from the actual slip rate of the wheel which has been switched to the foot brake pressure system is added. As a consequence of this, in the fourth modification, a maximum of four wheels are controlled as far as the control over the distribution of braking effort is concerned, and whenever there is a brake operation by the driver which exceeds the controlling pressure, the amount of operation by the driver is added thereto to provide a modified controlling pressure. The turn-on/off of the solenoid valves according to the braking effort distribution control of the fourth modification and the resulting wheel brake pressures are shown in FIG. 16.

The wheel brake pressures shown in FIG. 8 (first embodiment), FIG. 10 (first modification), FIG. 13 (second modification), FIG. 14 (third modification) and FIG. 16 (fourth modification), schematically illustrate a change when the controlled variables remain constant and when the stop switch 45 is turned on at time $t_1$ and the brake pressure from the master cylinder M/C subsequently rises at a constant rate. In actuality, the controlled variale sequentially changes with time, and accordingly, the wheel brake pressures do not necessarily remain constant until time $t_1$. In addition, the brake pressure from the master cylinder M/C may rise at a given rate, but also may rise at a varying rate or may descend, and accordingly the wheel brake pressures subsequent to time $t_1$ do not necessarily rise in a linear manner.

In the first embodiment, the first, the second and the third modification mentioned above, the solenoid operated open/close valves HSV1–4 are not controlled, and hence may be eliminated. In the fourth modification, the solenoid operated open/close valves HSV1–4 are required and essential since they are opened or closed in response to the turn-on/off of the stop switch 45.

As described, the apparatus for controlling wheel brake pressures according to the invention is capable of performing an antiskid (ABS) control, traction control (TRC) and a braking effort distribution control. In each of these controls, the brake pressures of all the wheel brakes, including both front and rear and left and right, can be individually regulated. In particular, during the braking effort distribution control, a substantially constant high pressure (tertiary pressure) generated by the source of constant pressure (21, 22), rather than the booster pressure (secondary pressure) can be supplied to respective wheel brakes individually, whereby a brake pressure which is required to secure the directional stability and the steerability can be supplied to any one of front and rear, and left and right wheel brakes, even though the brake pressure obtained by a brake operation by the driver remains low, thus achieving a high level of directional stability and steerability. In addition, since the high pressure generated by the source of constant pressure (21, 22) which is separate from the brake pressure obtained by the brake operation by the driver, is supplied to the intensifying/reducing means (312, 334, 356, 378), the brake pressures to the four wheels can be individually controlled in order to maintain a high level of directional stability and steerability even during a quick start which does not accompany a brake operation by the driver or during a rapid turn.

Second Embodiment

A wheel slip rate may rise to trigger an antiskid control as a result of a selective intensification or holding operation of the pressure of any one of the four wheel brakes subject to the braking effort distribution control. Alternatively, while one of the braking effort distribution control and the antiskid control may predominate over the other depending on the driving or running condition of the vehicle, they may be executed substantially concurrently. If a pressure regulation, starting from the decompression, is initiated according to the antiskid control when the pressures applied to the wheel brakes are regulated according to the braking effort distribution control, a conflict occurs between the both controls since the braking effort distribution control has a primary significance in intensifying the pressure while the antiskid control has a primary significance in the decompression.

Accordingly, in the second embodiment, (a) when the braking effort distribution control means (10) is intensifying or reducing the wheel brake pressures, a wheel slip rate at which the antiskid control is initiated is chosen high while such slip rate is chosen low when the distribution control means is not intensifying or reducing the pressure; (b) the antiskid control means (10) ceases to intensify or reduce the wheel brake pressures in response to the termination of the intensifying or reducing control of the wheel brake pressures by the braking effort distribution control means (10), and (c) the wheel brake pressures are temporarily intensified when the antiskid control means (10) terminates intensifying or reducing the wheel brake pressures during the time the intensifying or reducing control of the wheel brake pressures by the braking effort distribution control means (10) is taking place.

As a result of the choice according to paragraph (a), when the braking effort distribution control means (10) is intensifying or reducing the wheel brake pressures, a high wheel slip rate may be returned to a low value by initiating the regulation (reduction) of the wheel brake pressures by the antiskid control, and a relatively high wheel slip rate ceases the decompression, returning the operation to the intensifying operation. In this manner, the sensitivity to the initiation of the antiskid control becomes higher. In other words, the initiation of the antiskid control brings forth a greater effect, whereby the probability with which the antiskid control is initiated during the braking effort distribution control is reduced. When the braking effort distribution control means (10) is not intensifying or reducing the wheel brake pressures or such control is not substantially performed, the regulation (reduction) of the wheel brake pressures by the antiskid control is initiated from a relatively low level of wheel slip rate, thereby reducing the slip rate and interrupting the decompression at a relatively low level of wheel slip rate before the operation returns to the intensification. In this manner, the sensitivity to the initiation of the antiskid control is lessened, allowing the regulation of the braking effort by the antiskid control to be more effective.

As a result of the choice described under the paragraph (b), the wheel brake pressure is supplied by the output pressure from the brake master cylinder (2). When the braking effort distribution control means (10) is regulating the pressure, a combination of such regulation and the output pressure from the brake master cylinder (2) may result in a high slip rate. In other words, the regulation by the distribution control may induce a pressure regulation by the antiskid control, starting from the decompression. Such pressure regulation by the antiskid control becomes unnecessary upon interrupting the pressure regulation by the braking effort distribution control means (10) or upon termination of the braking effort distribution, and is therefore interrupted by the interrupting means (10). If the pressure regulation by the antiskid control is required even though the pressure regulation by the distribution control means (10) is terminated, the antiskid control means (10) reinitiate the pressure regulation. The pressure regulation which is reinitiated will be terminated whenever it is determined to be unnecessary to regulate the pressure by the antiskid control means (10) inasmuch as the braking effort distribution control means (10) is not performing a pressure regulation. The antiskid control which is induced as a result of the pressure regulation by the braking effort distribution control means (10) will be terminated as the pressure regulation by the distribution control means (10) is terminated, whereby a normal running condition can be resumed as soon as the pressure regulation by the distribution control means (10) is terminated.

While the antiskid control which takes place during the time the braking effort distribution control means (10) is intensifying or reducing the wheel brake pressures is likely to be induced as a result of the pressure regulation by the distribution control means (10) with a high probability, since the pressure regulation by the antiskid control initially starts from the decompression, it is highly probable that the brake pressure at the termination of the antiskid control will be lowered than the braking pressure which prevailed at the commencement of the antiskid control. As a result of the choice described under the paragraph (c), at the termination of the antiskid control, the wheel brake pressures will return close to the wheel brake pressures at the commencement of the antiskid control or the wheel brake pressures which obtain through the pressure regulation by the braking effort distribution control means (10), whereby the pressure regulation by the braking effort distribution control means (10) operates effectively. In this manner, it is assured that the wheel brake pressures will return to the pressures obtained by the regulation by the braking effort distribution control means (10) at an early time.

Figure 17:
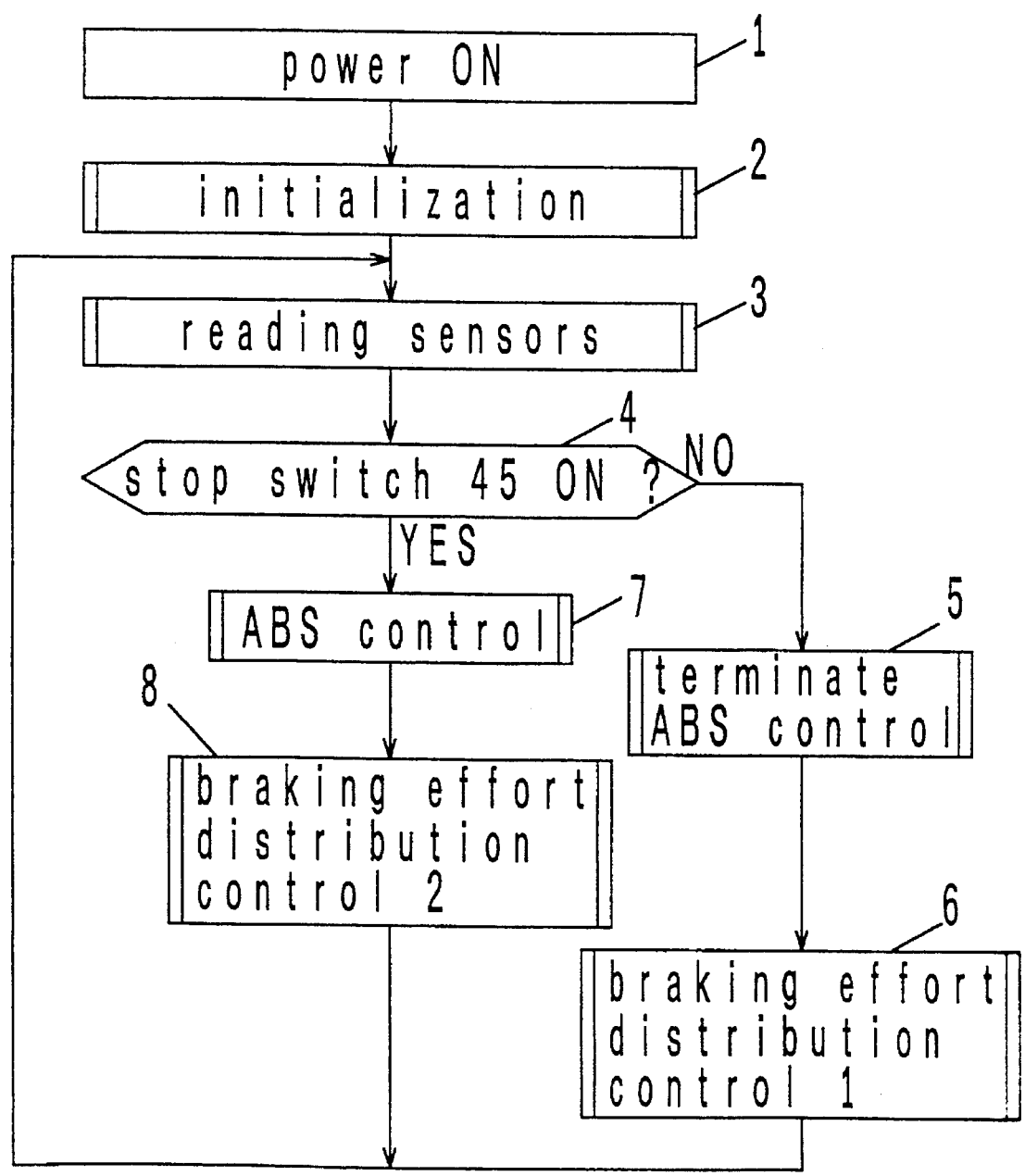
FIG. 17 is a flow chart indicating a wheel brake pressure control by the microcomputer 11 according to a second embodiment in detail.

It is to be understood that the hardware used for the second embodiment remains the same as used for the first embodiment or as shown in FIGS. 1 and 2. FIG. 17 shows a summary of the processing operation by the microcomputer 11 in the second embodiment. An onboard engine is started and the power supply for an onboard electrical system is turned on. After the system voltage is stabilized, operating voltages are applied to the electronic controller 10 (step 1 in FIG. 17). Upon application of the operating voltages, the microcomputer 11 initializes internal registers, input and output ports, and internal timers, and set up the connection of the input interface 12 to read inputs and set up the output interface 13 at output signal levels which prevail during the standby mode (step 2). The microcomputer commands the motor driver 19a to drive the motor 24 associated with the pump 21 to initiate a control over the liquid pressure in the accumulator 22. Concurrently, it repeatedly executes at a substantially given period of time a wheel brake pressure control, extending from "read operating board and sensors" (step 3) to "braking effort distribution control 2" (step 8). During the control over the liquid pressure in the accumulator 22, the motor 24 associated with the pump 21 ceases to operate when a pressure detected by the pressure sensor 46 reaches an upper limit, and when the low pressure switch 47 is closed or when the liquid pressure is reduced below a lower limit, the motor 24 is driven again.

During the wheel brake pressure control mentioned above, at step 3, information from every input means such as sensors and switches which are connected to the input interface 12 is read, and information is created which is referred to in determining the need to execute the ABS control and the braking effort distribution control, the need to reduce, intensify or hold the wheel brake pressures, the time duration of such operations and the need to terminate these operations in the same manner as mentioned above in connection with the first embodiment.

Upon reading such information and performing required calculations, the microcomputer 11 checks the open/closed condition of the stop switch 45 (step 4).

I. Control When Brake Pedal 3 is not Depressed

When the stop switch 45 is open or when the pedal 3 is not depressed, "terminate ABS" (step 5) is executed.

"Terminate ABS" (step 5)

Figure 18:
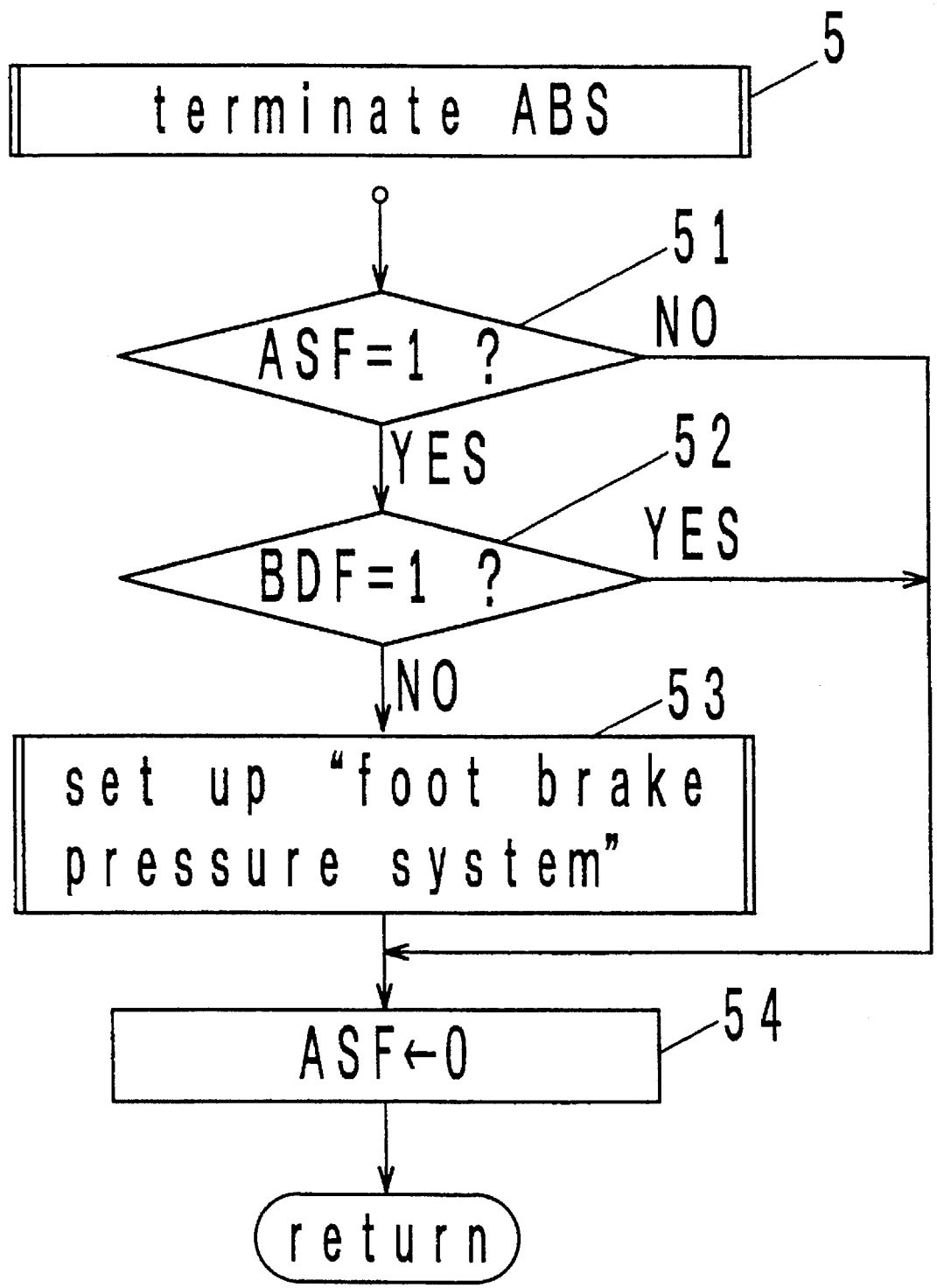
FIG. 18 is a flow chart showing "terminate ASB" (5) shown in FIG. 17 in detail.

The detail of this operation is shown in FIG. 18. Initially, the content of a register ASF which stores information concerning whether a pressure regulation by the ABS control has been initiated and another register BDF which stores information concerning whether a pressure regulation by the braking effort distribution control has been initiated are examined at steps 51 and 52, respectively. When the content of the register ASF is 0, indicating that the pressure regulation by the ABS control has not been initiated, the register ASF is updated to 0 (step 54), whereupon the "terminate ABS" (step 5) is completed. The operation then proceeds to next following "braking effort distribution control 1" (step 6). If the content of the register ASF is equal to 1, indicating that the pressure regulation by the ABS control has been initiated, but if the content of the register BDF is equal to 1, indicating that the pressure regulation by the braking effort distribution control has been initiated, the register ASF is again updated to 0 (step 54) to complete the "terminate ABS" (step 5). If the content of the register BDF is equal to 0, indicating that the pressure regulation by the braking effort distribution control has not been initiated, the wheel brake pressure system (FIG. 1) is connected according to the "foot brake pressure system" indicated in Tables 1 and 2, and the register ASF is updated to 0 (step 54), thus completing the "terminate ABS" (step 5). Thus, during the "terminate ABS" (step 5), since the pedal 3 has not been depressed and the switch 45 remains off, there is no need to perform the ABS control, which is therefore terminated. However, when the pressure regulation by the braking effort distribution control has been initiated (BDF=1), the wheel brake pressure system cannot be returned to the "foot brake pressure system", and accordingly no switching of the connection of the wheel brake pressure system takes place. The microcomputer 11 then proceeds to "braking effort distribution control 1" (step 6).

"Braking Effort Distribution Control 1" (step 6)

Figure 19:
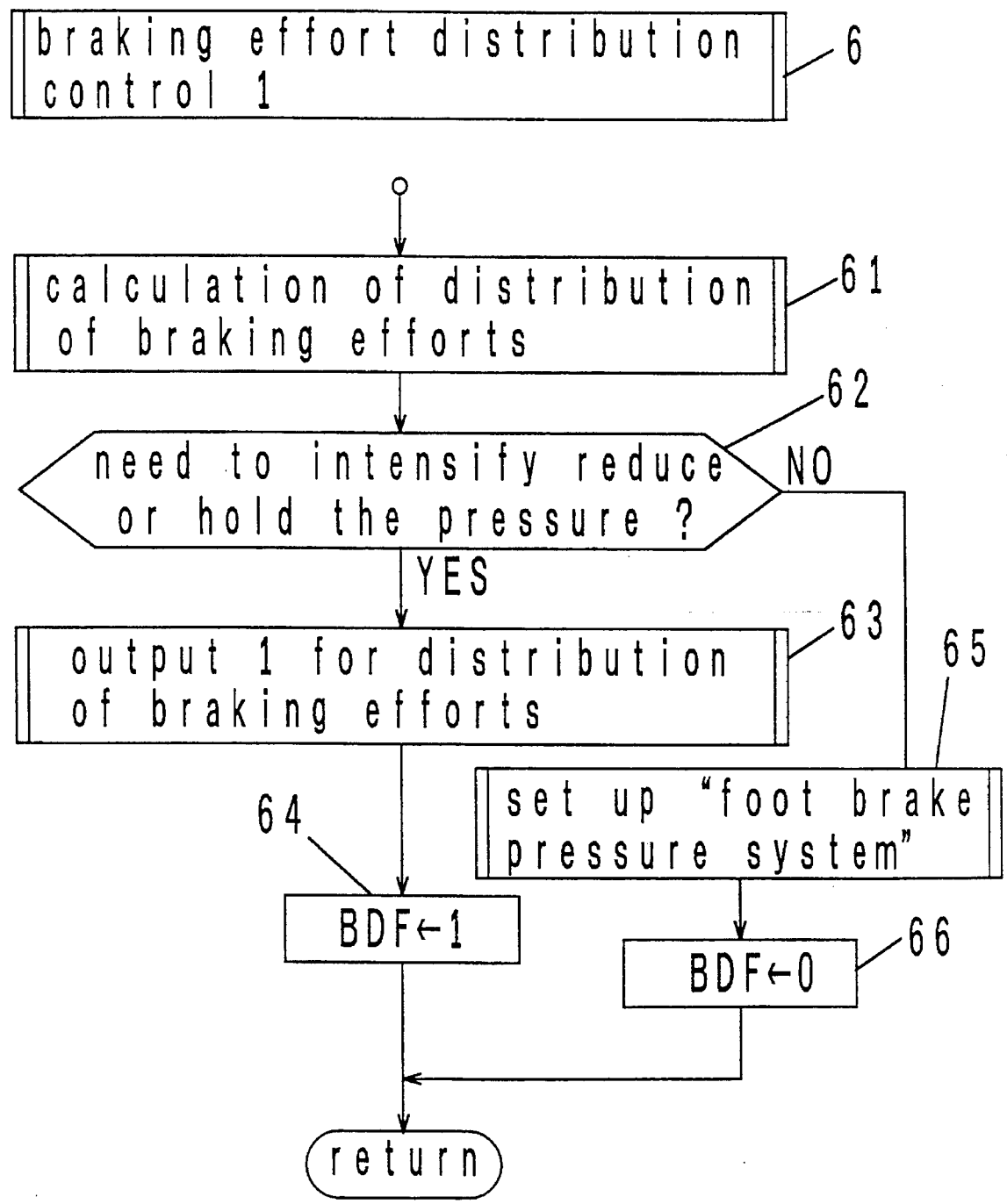
FIG. 19 is a flow chart showing "control 1 over the distribution of braking efforts" (6) shown in FIG. 17 in detail.

This is shown in detail in FIG. 19. Initially, "calculation of distribution of braking efforts" (step 61) is executed. Referring to front and rear wheel steer angles θf and θr, a reference speed and a turning direction DIR, a spin/drift of the vehicle is calculated. On the basis of the spin/drift and an estimated vehicle speed Vso, the need to control the wheel brake pressures in order to secure the directional stability and steerability of the vehicle is determined. If such need is found to be present, a distribution of braking efforts in order to secure the directional stability and steerability, which is specifically an allotment of intensifying/reducing/holding the pressures applied to the wheel brakes 51–54, is determined through a map retrieval on the basis of the steer angle θf and the spin/drift. A map retrieval is also utilized to determine the rate at which the pressure is intensified (or the duty cycle of energization of the intensifying valves 31, 33, 35, 37) and the rate at which the pressure is reduced (or the duty cycle of energization of the reducing valves 32, 34, 36, 38) from the spin/drift and the estimated vehicle speed Vso.

When it is determined that there is no need to intensify, reduce or hold the pressures for any wheel brake, an acceleration slip rate of each wheel, that is, the rate by which a wheel speed is higher than the vehicle speed when there is no depression of the pedal 3, is determined by referring to the slip rates of the individual wheels. When there is an acceleration slip which exceeds a given level, a target slip rate and a deviation of slip rate (=a target slip rate–actual slip rate) is calculated for each wheel by referring to the slip rates and accelerations of the respective wheels and the estimated vehicle speed, and the need to intensify, reduce or hold the pressures applied to the individual wheel brakes as well as the intensifying/reducing rate or the duty cycle of energization, whenever either intensifying or reducing operation is required are determined. All these operations takes place at step 61.

If a need to intensify, reduce or hold the pressure is determined to be present for one of the wheel brakes, control signals are delivered which realize the determined distribution of braking efforts and the determined intensifying or reducing rate (step 63). "1", representing that a pressure regulation by the braking effort distribution control is taking place, is written into register BDF (step 64). The wheel brake pressure system is connected according to the "braking effort distribution control pressure system" indicated in Tables 1 and 2 only for the circuit which relates to the particular wheel brake for which the need to intensify, reduce or hold the pressure has been determined while the remaining wheel brakes are connected according to the "foot brake pressure system". Either intensifying or reducing valve of the intensifying/reducing valve unit (312, 334, 356 or 378) connected to the wheel brake for which the need to intensify, reduce or hold the pressure has been determined is energized with the duty cycle of energization determined in a manner mentioned above. When holding the pressure is required, the intensifying valve is continuously energized (or the duty cycle is equal to 100%), and the reducing valve is deenergized (or the duty cycle is equal to 0%).

When the need to control the wheel brake pressures in order to secure the directional stability and steerability of the vehicle is found unnecessary, or no intensifying, reducing or holding operation is unnecessary for any wheel, the wheel brake pressure system is switched from the connection according to the "braking effort distribution control pressure system" to the connection according to the "foot brake pressure system" indicated in Tables 1 and 2 (step 65) and "0" representing no pressure regulation by the braking effort distribution control is written into register BDF or clearing this register.

Returning to FIG. 17, as long as the stop switch 45 remains off, the microcomputer 11 loops around a path including "read sensors" (step 3)—"stop switch 45 on?" (step 4)—"terminate ABS" (step 5)—"braking effort distribution control 1" (step 6)—and returning to "read sensors" (step 3). As soon as the stop switch 45 is turned on, the microcomputer 11 proceeds to "ABS control" (step 7).

II. Control When Brake Pedal 3 is Depressed

Figure 20:
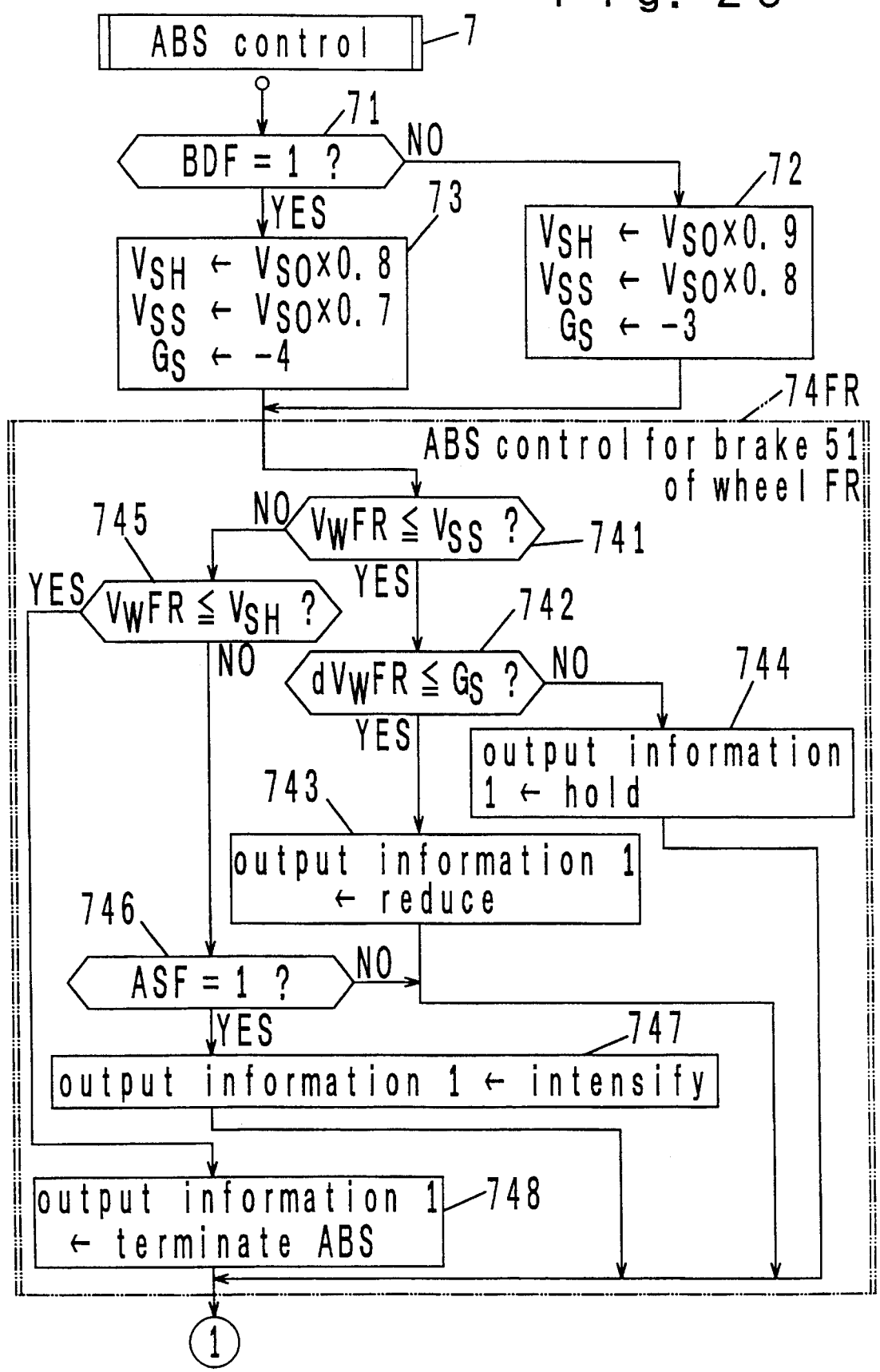
FIG. 20 is a flow chart indicating part of "ASB control" (7) shown in FIG. 17 in detail.
Figure 21:
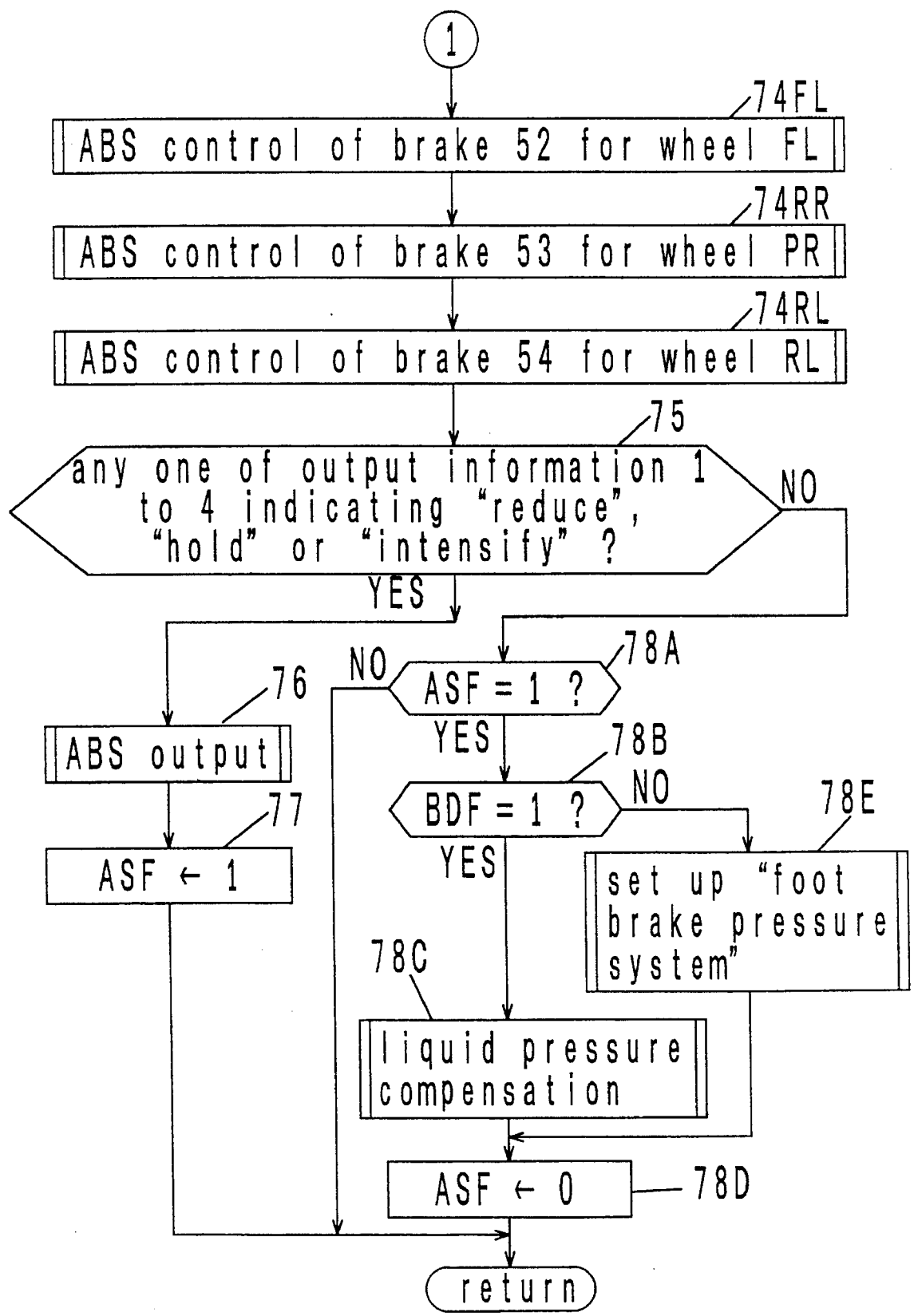
FIG. 21 is a flow chart indicating the remainder of the "ASB control" (7) shown in FIG. 17.
Figure 23:
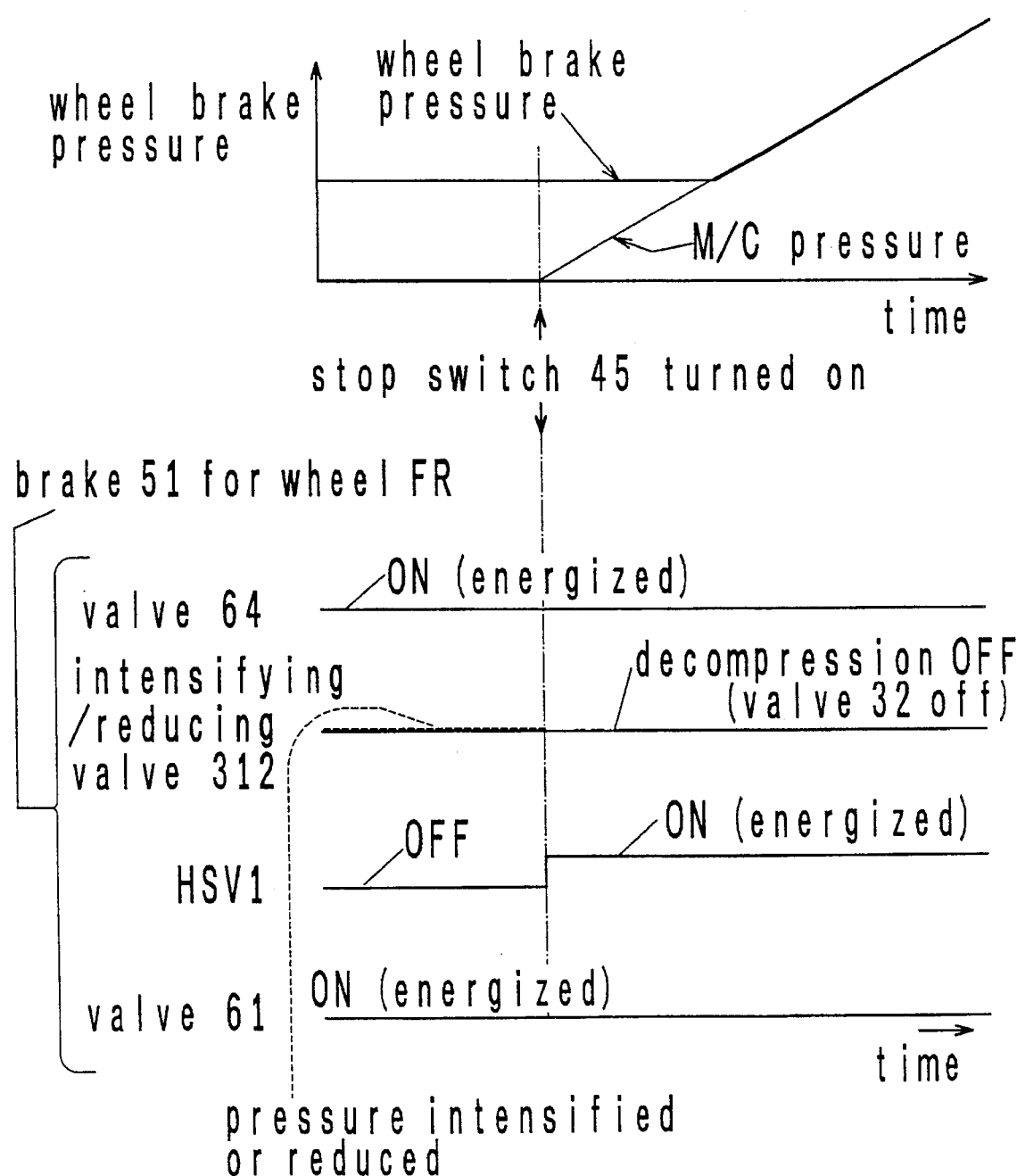
FIG. 23 is a series of timing charts indicating a change in the wheel brake pressure which occurs in the second embodiment when the microcomputer 11 automatically intervenes with a wheel brake pressure according to the control over the distribution of braking efforts 1 and 2 in the absence of depression of a brake pedal 3 and continues such automatic intervention after the brake pedal 3 has been depressed.

"ABS control" (step 7): The detail of this control is shown in FIGS. 20 and 23. Initially, the content of register BDF is examined (step 71) and if the content of register BDF is equal to 0, indicating the absence of any pressure regulation by the braking effort distribution control, a target zone for a wheel slip rate, which is a deceleration slip rate since it is now being braked, is set up between an upper limit of 90% and a lower limit of 80%. Corresponding upper and lower limits $V_{SH}$ and $V_{SS}$ of the wheel speed are calculated, and a reference value Gs for the wheel acceleration which is used in determining the need to decompress is chosen to be equal to −3 (a negative value being used because it is a deceleration) (step 72). However, if the content of register BDF is equal to 1, indicating the presence of a pressure regulation by the braking effort distribution control, a target zone for the wheel slip rate is defined between an upper of 80% and a lower limit of 70% and corresponding upper limit $V_{SH}$ and lower limit $V_{SS}$ of the wheel speed are calculated, and a reference value Gs for the wheel acceleration which is used to determine the need to decompress is chosen to be equal to −4 (a negative value indicating a deceleration) (step 73).

To consider the brake 51 associated with the front right wheel FR, the speed VwFR of the wheel FR is compared against the upper and the lower limit $V_{SH}$ and $V_{SS}$, and the wheel acceleration (a negative value indicating a deceleration) dVwFR is compared against the reference value Gs for the acceleration to determine the need to reduce, intensify or hold the pressure as indicated below (step 74FR);

If VwFR≦$V_{SS}$ and dVwFR≦Gs, reduce the pressure (steps 741, 742, 743),

If VwFR≦$V_{SS}$ and dVwFR>Gs, hold the pressure (steps 741, 742, 744),

If VwFR>$V_{SS}$ and ASF=1, indicating that a pressure regulation by the ABS control is being executed, intensify the pressure (steps 741, 745, 746, 747), If $VwFR > V_{SS}$ and ASF=0, indicating no pressure regulation is being executed by the ABS control, there is no need to regulate the pressure, and If $VwFR \geq V_{SH}$, terminate the pressure regulation by the ASB control.

Similarly, with respect to the brake 52 associated with the front left wheel FL, the wheel speed VwFL is compared against the upper and the lower limit $V_{SH}$ and $V_{SS}$ and the wheel acceleration dVwFL (again a negative value indicating a deceleration) is compared against a reference value Gs for the acceleration to determine the need to reduce, intensify or hold the pressure (step 74FL). Also in the similar manner, with respect to the brake 53 associated with the rear right wheel RR, the wheel speed VwRR is compared against the upper and the lower limit $V_{SH}$ and $V_{SS}$ and the wheel acceleration dVwRR is compared against a reference value Gs for the acceleration to determine the need to reduce, intensify or hold the pressure (step 74RR). Finally, with respect to the brake 54 associated with the rear left wheel RL, the wheel speed VwRL is compared against the upper and the lower limit $V_{SH}$ and $V_{SS}$ and the wheel acceleration dVwRL is compared against a reference value Gs for the acceleration to determine the need to reduce, intensify or hold the pressure (step 74RL).

If the need to reduce, intensify or hold the pressure is found to be present in one of the processings at the steps 74FR, 74FL, 74RR and 74RL, a control signal which implements the pressure regulating mode determined is delivered (step 76). "1" indicating a pressure regulation being conducted by the ABS control is written into register ASF (step 77). In the wheel brake pressure system, only the circuit relating to the wheel brake for which the need to increase, reduce or hold the pressure has been determined is connected according to the "ABS control pressure system" indicated in Tables 1 and 2 while the remaining wheel brakes are connected according to the "foot brake pressure system". Either intensifying or reducing valve of the intensifying/reducing valve unit (312, 334, 356 or 378) connected to the wheel brake for which the need to intensify, reduce or hold the pressure has been determined is energized with a duty cycle which corresponds to the pressure regulating mode determined. When holding the pressure, the intensifying valve is continuously energized (or the duty cycle is equal to 100%) while the reducing valve is deenergized (or the duty cycle is equal to 0%). When the need to reduce, intensify or hold the pressure has not been determined in any of the steps 74FR, 74FL, 74RR and 74RL, it follows that any ABS control which has been initiated with ASF=1 is no longer necessary and is therefore terminated. Accordingly, "0" indicating the absence of a pressure regulation by the ABS control is written into register ASF (step 78D). However, before this takes place, an examination is made to see if the braking effort distribution control is being conducted (or if BDF=1) (step 78B), and if it is, it is possible that the wheel brake pressures were reduced below the output pressure from the master cylinder as a result of the pressure regulation by the ABS control. Accordingly, the reducing valve 32, 34, 36 or 38 is closed while the intensifying valve 31, 33, 35 or 37 of the intensifying/reducing valve unit 312, 334, 356 or 378 is opened to provide "liquid pressure compensation" by waiting for a given short length of time to pass (step 78C). In the meantime, the wheel brake pressure rises through the intensifying valve. After the given length of time has passed, "0" is written into register ASF (step 78D). This substantially completes the ABS control, and since the braking effort distribution control is effective (BDF=1), the wheel brake pressures are subsequently regulated according to the braking effort distribution control.

If the braking effort distribution control were not in effect (or BDF=0) at the termination of the ABS control, the "foot brake pressure system" is established (step 78E) without the execution of the "liquid pressure compensation" (step 78C), and "0" is written into register ASF (step 78D). At step 78E, the wheel brake pressure system is switched to the connection according to the "foot brake pressure system" indicated in Tables 1 and 2, and HSV1–4 are deenergized. The microcomputer 11 then executes "braking effort distribution control 2" (step 8).

"Braking Effort Distribution Control 2" (step 8)

Figure 22:
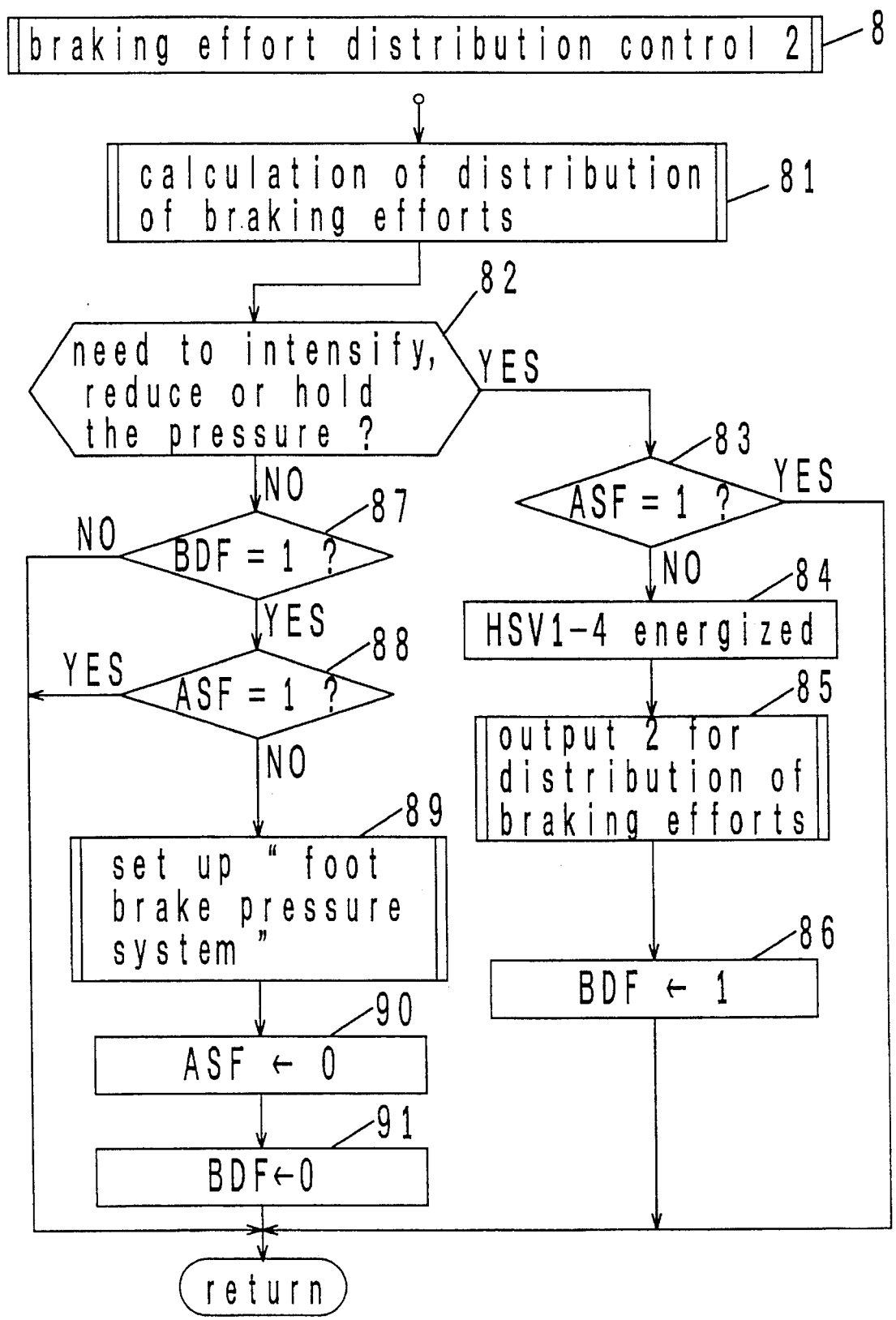
FIG. 22 is a flow chart of "control over the distribution of braking efforts" (8) shown in FIG. 17.

The detail of this control is shown in FIG. 22. Initially, "calculation of distribution of braking efforts" (step 81) is executed. The content of the "calculation of distribution of braking efforts" is identical with the "calculation of distribution of braking efforts" which has taken place at step 61, and therefore will not specifically described. If the need to intensify, reduce or hold the pressure of either wheel brake is found at "calculation of distribution of braking efforts" (step 81), the content of register ASF is examined (step 83), and if it is equal to "1", indicating that a pressure regulation by the ABS control is being conducted, a pressure regulating mode which is determined at step 81 is not delivered as an output in order to prevent the pressure regulation by the ABS control from being disturbed. However, when the content of register ASF is equal to "0", indicating the absence of any pressure regulation by the ABS control, open/close valves HSV1–4 are energized, whereby the output pressure from the brake master cylinder 2 is also applied to the wheel brakes, and the control output which realizes the pressure regulating mode determined at step 81 is delivered (step 85). The detail of "output 2 of distribution of braking efforts" (step 85) is similar to "output 1 of distribution of braking efforts" (step 63) except that "decompression" which is determined at step 81 is replaced by "hold". This is because if the "decompression" is executed, the reducing valve (32, 34, 36 or 38) will be opened to allow the output pressure from the master cylinder 2 to be passed to the reservoir through that reducing valve to defeat the intent of the driver. To prevent such release of wheel brake pressures from occurring, "decompression" is replaced by "holding" at step 85. Accordingly, as a result of executing the steps from step 81 to step 85, it follows that a higher one of the intensified pressure as determined by the step 81 and the output pressure from the master cylinder 2 is applied to the wheel brake (see FIG. 23). When this output is delivered, "1" indicating the presence of a pressure regulation by the braking effort distribution control is written into register BDF (step 86).

If the need to intensify, reduce or hold the pressure is found absent in the "calculation of distribution of braking efforts" (step 81), the content of registers BDF and ASF is examined (steps 87 and 88).

When the content of both registers BDF and ASF is equal to "0", indicating the absence of any pressure regulation by either the braking effort distribution control or the ABS control, the wheel brake pressure system is switched to the connection according to the "foot brake pressure system" indicated in Tables 1 and 2, and HSV1–4 are deenergized (step 90), and "0" is written into registers ASF and BDF.

When the content of register BDF is equal to "1", this means that the pressure regulation by the braking effort distribution control which has been executed will be terminated. However, if the content of register ASF is equal to "1", indicating that the pressure regulation by the ABS control is effective, it is highly probable that the pressure regulation by the ABS control has been induced by the pressure regulation by the braking effort distribution control. For this reason, the pressure regulation by the ABS control is also terminated. Accordingly, the wheel brake pressure system is switched to the connection according to the "foot brake pressure system" indicated in Tables 1 and 2, HSV1–4 are deenergized (step 89) and "0" is written into registers ASF and BDF (steps 90 and 91).

As a result of the pressure control by the microcomputer 11 in the manner mentioned above, the wheel brake pressures will be determined as mentioned below.

(1) When an automatic intervention to the wheel brake pressures by the braking effort distribution control or ABS control is absent:

The wheel brake pressure system is connected according to the "foot brake pressure system" indicated in Tables 1 and 2 where all the solenoid valves shown in FIG. 1 are deenergized, and when the driver has not depressed the pedal 3, the output pressure from the master cylinder 2 is substantially 0, and accordingly, the wheel brake pressures are substantially 0. Upon depression of the pedal 3 by the driver, the output pressure from the master cylinder 2 assumes a pressure which corresponds to the degree of depression, and the wheel brake pressure corresponds to the output pressure from the master cylinder 2.

(2) When ABS control is effective:

When an intervention to the wheel brake pressures by the ABS control is present, a brake pressure system associated with a particular wheel brake to which the automatic intervention has been made is connected according to the "ABS control pressure system" shown in Tables 1 and 2, and the intensifying/reducing valve unit (312, 334, 356, 378) is effective to decompress the wheel brake pressure initially, and subsequently reduce or intensify the pressure in accordance with a subsequent change in the wheel speed, thus causing a change in the wheel brake pressure.

(3) When the braking effort distribution control 1 is effective without depression of the pedal 3 (stop switch 45 off):

In the absence of depression of the pedal 3, the individual wheel brake pressures are either intensified, held or reduced in accordance with the braking effort distribution control 1, and are subject to a variation with time. The decompression is significant in withdrawing the brake pressures which have once been intensified.

(4) When braking effort distribution control 2 is effective with depression of the pedal 3 (stop switch 45 on) (see FIG. 23):

The individual wheel brake pressures are either intensified, held or reduced in accordance with the braking effort distribution control, but the decompression is replaced by "hold" in order to avoid any output for purpose of decompression. Thus either intensifying or holding the pressure takes place, but the decompression does not take place. The output pressure from the master cylinder 2 is also applied to the wheel brakes, and the wheel brake pressure will be a higher one of the intensified or held pressure according to the braking effort distribution control 2 or the output pressure from the master cylinder 2. When the ABS control, which has been initiated during the braking effort distribution control, is terminated during the braking effort distribution control, the wheel brake pressures are once intensified to compensate for a reduction in the pressures which are brought forth by the ABS control in order to smooth the effect of pressures resulting from the braking effort distribution control. If the braking effort distribution control is terminated during the ABS control, the ABS control is also forcibly terminated.

(5) When the braking effort distribution control 2 is executed in response to the depression of the pedal 3 which occurs during the execution of the braking effort distribution control 1 (FIG. 22):

If the pedal 3 is depressed during the execution of the braking effort distribution control 1, and the control is switched to the braking effort distribution control 2, the wheel brake pressures changes as shown in FIG. 23.

With the second embodiment described above, during the antiskid control, the need to intensify or reduce the pressures applied to the individual wheel brakes is determined in order to maintain the wheel slip rate within a given zone, and if such need is found to be present, the wheel brake pressures are either intensified or reduced through the intensifying/reducing valve units 312, 334, 356, 378. However, such zone is chosen to be a high zone when the wheel brake pressures are being intensified or reduced by the braking effort distribution control and to be a low zone otherwise (steps 71–73 in FIG. 20). Accordingly, when the wheel brake pressures are being intensified or reduced by the braking effort distribution control, a high wheel slip rate results in initiating a regulation (decompression) of the wheel brake pressures through the antiskid control to reduce the wheel slip rate, and the decompression ceases to operate at a relatively high wheel slip rate before returning to the intensifying operation. In other words, the sensitivity at which the antiskid control is initiated becomes higher, reducing the probability that the antiskid control is initiated during the braking effort distribution control. When the braking effort distribution control is not being substantially performed or the wheel brake pressures are not being intensified or reduced in accordance with such distribution control, a regulation (decompression) of the wheel brake pressures according to the antiskid control is initiated at a relatively low level of the wheel slip rate to reduce the latter, and the decompression ceases at a relatively low wheel slip rate before returning to the intensifyging operation. In this manner, the sensitivity with which the antiskid control is initiated becomes smaller, making an adjustment of the braking effort by the antiskid control more effective.

A regulation of the wheel brake pressures by the antiskid control is interrupted in response to the termination of the intensifying or reducing control of the wheel brake pressures which is conducted to distribute the braking efforts. Thereafter, the wheel brake pressure assumes the output pressure from the brake master cylinder 2. When a pressure regulation is being executed by the braking effort distribution control, the combination of the pressure regulation and the output pressure from the brake master cylinder 2 may result in a high slip rate. In other words, the pressure regulation according to the braking effort distribution control may induce a pressure regulation by the antiskid control, starting from the decompression. Such pressure regulation by the antiskid control becomes unnecessary when the pressure regulation by the braking effort distribution control ceases or at the termination of the distribution of the braking efforts, and is therefore ceases to operate. If the pressure regulation by the antiskid control happens to be necessary even though pressure regulation by the braking effort distribution control has been terminated, the pressure regulation by the antiskid control is restarted. Because the pressure regulation by the braking effort distribution control is absent, the pressure regulation which is restarted is terminated whenever it is found unnecessary by a decision which sees the need to regulate the pressure by the antiskid control. When the antiskid control is terminated during the braking effort distribution control, the wheel brake pressures are temporarily intensified at "liquid pressure compensation" (step 78B). This allows the wheel brake pressures to return close to the wheel brake pressures which prevailed upon initiating the antiskid control or the wheel brake pressures obtained by the braking effort distribution control, when the antiskid control is terminated, making the braking effort distribution control effective. In other words, the wheel brake pressures return to the pressures obtained by the braking effort distribution control at an early point in time.

We claim:

1. An apparatus for controlling wheel brake pressures in a plurality of wheels comprising brake pressure generating means (2,5) operated by a driver for generating a pressure which responds to a magnitude of operation by the driver;

a source of constant pressure (21, 22) for producing a substantially constant high pressure;

selection means (64, 65, 61–63) for each wheel for selecting one of the pressure corresponding to the magnitude of operation and the high pressure produced by the source;

first intensifying/reducing means (312) for selectively supplying either pressure, selected by the selection means, or a low pressure to a front right wheel brake (51);

second intensifying/reducing means (334) for selectively supplying either pressure, selected by the selection means, or a low pressure to a front left wheel brake (52);

third intensifying/reducing means (356) for selectively supplying either pressure, selected by the selection means, or a low pressure to a rear right wheel brake (53);

and fourth intensifying/reducing means (378) for selectively supplying either pressure, selected by the selection means, or a low pressure to a rear left wheel brake (54).

2. An apparatus according to claim 1, further comprising wheel speed detecting means (41–44) for detecting a rotational speed of a wheel;

angle detecting means (θF, θR) for detecting a steering angle of a vehicle;

yaw rate detecting means (YA) for detecting a yaw rate of a vehicle;

acceleration detecting means (GZ, GY) for detecting a fore-and-aft acceleration and a lateral acceleration of a car body;

antiskid control means (10) for determining pressures to be applied to individual wheel brakes in order to maintain a wheel slip rate within a given zone on the basis of a speed detected by the wheel speed detecting means (41–44), and for causing the selection means (64, 65, 61–63) to select the high pressure produced by the source (21, 22) and for intensifying or reducing the wheel brake pressures through the intensifying/reducing means (312, 334, 356, 378);

and braking effort distribution control means (10) for calculating a distribution of a target braking effort for each of the wheel brakes in order to secure a running stability of the vehicle on the basis of the steering angel, the yaw rate, the fore-and-aft acceleration and the lateral acceleration, and for causing the selection means (64, 65, 61–63) to select the high pressure produced by the source (21, 22) and causing the intensifying/reducing means (312, 334, 356, 378) to intensify or reduce the wheel brake pressures.

3. An apparatus according to claim 1 in which the brake pressure generating means (2, 5) includes a master cylinder (2) operated by a driver for generating a primary pressure which corresponds to the magnitude of operation, and a booster (5) for generating a secondary pressure higher than and substantially proportional to the primary pressure, and in which the selection means (64, 65, 61–63) includes first selection means (64, 65) for selecting one of the secondary pressure and a tertiary pressure which is the high pressure produced by the source (21, 22), and second selection means (61–63) for selecting and delivering one of the pressure selected by the first selection means (64, 65) and the primary pressure.

4. An apparatus according to claim 3, further comprising wheel speed detecting means (41–44) for detecting a rotational speed of a wheel;

angle detecting means (θF, θR) for detecting a steering angle of a vehicle;

Yaw rate detecting means (YA) for detecting a yaw rate of the vehicle;

acceleration detecting means (GX, GY) for detecting a fore-and-aft acceleration and a lateral acceleration of a car body;

antiskid control means (10) for determining the the pressures to be applied to the individual wheel brakes in order to maintain a wheel slip rate within a given zone on the basis of a speed detected by the wheel speed detecting means (41–44), and controlling the second selection means (61–63) to select the pressure selected by the first selection means (64, 65) to intensify or reduce the wheel brake pressures through intensifying/reducing means (312, 334, 356, 378);

and braking effort distribution control means (10) for calculating a distribution of target braking efforts of respective wheel brakes in order to secure a running stability of the vehicle on the basis of the steering angle, the yaw rate, the fore-and-aft acceleration and the lateral acceleration, and controlling the first selection means (64, 65) to select the tertiary pressure and the second selection means (61–63) to select the pressure selected by the first selection means (64, 65) to intensify or reduce the wheel brake pressures through the intensifying/reducing means (312, 334, 356, 378) to provide braking of at least one wheel brake.

5. An apparatus according to claim 1, further comprising open/close means (HSV1–4) interposed between a pressure output port of the brake pressure generating means (2, 5) and the wheel brakes (51–54) and having an open valve position where a flow of a fluid in a direction to withdraw the pressure from the wheel brakes is blocked while the output pressure from the brake pressure generating means (2, 5) is supplied to the wheel brakes and a closed valve position where the supply of the output pressure from the brake pressure generating means is interrupted.

6. An apparatus according to claim 5, further comprising brake operation detecting means (45) for detecting an operation of the brake pressure generating means (2, 5) by a driver;

wheel speed detecting means (41–44) for detecting a rotational speed of a wheel;

angle detecting means (θF, θR) for detecting a steering angle of a vehicle;

yaw rate detecting means (YA) for detecting a yaw rate of the vehicle;

acceleration detecting means (GX, GY) for detecting a fore-and-aft acceleration and a lateral acceleration of a car body;

antiskid control means (10) for determining pressures to be applied to individual wheel brakes in order to maintain a wheel slip rate within a given zone on the basis of a speed detected by the wheel speed detecting means (41–44), and for causing the selection means (64, 65, 61–63) to select the high pressure produced by the source (21, 22) to intensify or reduce the wheel brake pressures through intensifying/reducing means (312, 334, 356, 378);

and braking effort distribution control means (10) for calculating a distribution of target braking efforts of the respective wheel brakes in order to secure a running stability of the vehicle on the basis of the steering angle, the yaw rate, the fore-and-aft acceleration and the lateral acceleration, and for causing the selection means (64, 65, 61–63) to select the high pressure produced by the source (21, 22) to intensify or reduce the wheel brake pressures through the intensifying/ reducing means (312, 334, 356, 378) and for switching the open/close means (HSV1–4) to its open valve position in response to the detection of an operation by the driver by the brake operation detecting means (45).

7. An apparatus according to claim 5 in which the brake pressure generation means (2, 5) includes a master cylinder (2) operated by a driver for generating a primary pressure which corresponds to the magnitude of operation, and a booster (5) for generating a secondary pressure higher than and substantially proportional to the primary pressure; and in which the selection means (64, 65, 61–63) includes first selection means (64, 65) for selecting one of the secondary pressure and a tertiary pressure which is the high pressure produced by the source (21, 22), and second selection means (61–63) for selecting and delivering one of the pressure selected by the first selection means and the primary pressure, the apparatus further comprising brake operation detecting means (45) for detecting an operation of the brake pressure generating means (2, 5) by a driver;

wheel speed detecting means (41–44) for detecting a rotational speed of a wheel;

angle detecting means (θF, θR) for detecting a steering angle of a vehicle;

yaw rate detecting means (YA) for detecting a yaw rate of the vehicle;

acceleration detecting means (GX, GY) for detecting a fore-and-aft acceleration and a lateral acceleration of a car body;

antiskid control means (10) for determining the pressures to be applied to individual wheel brakes in order to maintain a wheel slip rate within a given zone on the basis of a speed detected by the wheel speed detecting means (41–44), and for causing the second selection means (61–63) to select the pressure selected by the first selection means (64, 65) to intensify or reduce the wheel brake pressures through the intensifying/reducing means (312, 334, 356, 378);

and braking effort distribution control means (10) for calculating a distribution of target braking efforts of respective wheel brakes in order to secure a running stability of the vehicle on the basis of the steering angle, the yaw rate, the fore-and-aft acceleration and the lateral acceleration, and for causing the first selection means (64, 65) to select the tertiary pressure and for causing the second selection means (61–63) to select the pressure selected by the first selection means (64, 65) to intensify or reduce the wheel brake pressures through the intensifying/reducing means (312, 334, 356, 378) and for switching the open/close means (HSV1–4) to its open valve position in response to the detection of an operation of a driver by the brake operation detecting means (45).

8. An apparatus according to claim 1, further comprising wheel speed detecting means (41–44) for detecting a rotational speed of a wheel;

angle detecting means (θF, θR) for detecting a steering angle of a vehicle;

yaw rate detecting means (YA) for detecting a yaw rate of the vehicle;

acceleration detecting means (GX, GY) for detecting a fore-and-aft acceleration and a lateral acceleration of a car body;

braking effort distribution control means (10) for calculating a distribution of target braking efforts of individual wheel brakes in order to secure a running stability of the vehicle on the basis of the steering angle, the yaw rate, the fore-and-aft acceleration and the lateral acceleration, and for intensifying or reducing the wheel brake pressures through intensifying/reducing means (312, 334, 356, 378);

antiskid control means (10) for determining the pressures to be applied to the individual wheel brakes in order to maintain a wheel slip rate within a given zone on the basis of a speed detected by the wheel speed detecting means (41–44), and for intensifying or reducing the wheel brake pressures through intensifying/reducing means (312, 334, 356, 378);

and reference value means (10) for choosing a high zone for the given zone whenever the braking effort distribution control means (10) is intensifying or reducing the wheel brake pressures and for choosing a low zone for the given zone otherwise.

9. An apparatus according to claim 1, further comprising wheel speed detecting means (41–44) for detecting a rotational speed of a wheel;

angle detecting means (θF, θR) for detecting a steering angle of a vehicle;

yaw rate detecting means (YA) for detecting a yaw rate of the vehicle;

acceleration detecting means (GX, GY) for detecting a fore-and-aft acceleration and a lateral acceleration of a car body;

braking effort distribution control means (10) for calculating a distribution of target braking efforts of individual wheel brakes in order to secure a running stability of the vehicle on the basis of the steering angle, the yaw rate, the fore-and-aft acceleration and the lateral acceleration, and for intensifying or reducing the wheel brake pressures through intensifying/reducing means (312, 334, 356, 378);

antiskid control means (10) for determining the pressures to be applied to individual wheel brakes in order to maintain a wheel slip rate within a given zone on the basis of a speed detected by the wheel speed detecting means (41–44), and for intensifying or reducing the wheel brake pressures through intensifying/reducing means (312, 334, 356, 378);

and means for interrupting the intensifying or reducing operation upon the wheel brake pressures by the antiskid control means (10) in response to the termination of the intensifying or reducing operation upon the wheel brake pressures by the braking effort distribution control means (10).

10. An apparatus according to claim 1, further comprising
wheel speed detecting means (41–44) for detecting a rotational speed of a wheel;
angle detecting means (θF, θR) for detecting a steering angle of a vehicle;
yaw rate detecting means (YA) for detecting a yaw rate of the vehicle;
acceleration detecting means (GX, GY) for detecting a fore-and-aft acceleration and a lateral acceleration of a car body;
braking effort distribution control means (10) for calculating a distribution of target braking efforts of individual wheel brakes in order to secure a running stability of the vehicle on the basis of the steering angle, the yaw rate, the fore-and-aft acceleration and the lateral acceleration, and for causing intensifying/reducing means (312, 334, 356, 378) to intensify or reduce the wheel brake pressures;
antiskid control means (10) for determining the pressures to be applied to the individual wheel brakes in order to maintain a wheel slip rate within a given zone on the basis of a speed detected by the wheel speed detecting means (41–44), and for intensifying or reducing the wheel brake pressures through intensifying/reducing means (312, 334, 356, 378);
and liquid pressure compensation means (10) for temporarily intensifying the wheel brake pressure at the end of a control by the antiskid control means (10) to intensify or reduce the wheel brake pressures during the time the braking effort distribution control means (10) is intensifying or reducing the wheel brake pressures.

* * * * *